(12) United States Patent
van Raemdonck

(10) Patent No.: US 8,616,616 B2
(45) Date of Patent: Dec. 31, 2013

(54) SIDE SKIRT FOR A PULLED VEHICLE

(75) Inventor: Gandert Marcel Rita van Raemdonck, Beveren (BE)

(73) Assignee: Ephicas Patents BVBA, Brussels (BE)

( * ) Notice: Subject to any disclaimer, the term of this patent is extended or adjusted under 35 U.S.C. 154(b) by 254 days.

(21) Appl. No.: 12/672,923

(22) PCT Filed: Aug. 4, 2008

(86) PCT No.: PCT/NL2008/000187
§ 371 (c)(1),
(2), (4) Date: Mar. 12, 2012

(87) PCT Pub. No.: WO2009/022904
PCT Pub. Date: Feb. 19, 2009

(65) Prior Publication Data
US 2012/0153668 A1    Jun. 21, 2012

Related U.S. Application Data

(60) Provisional application No. 60/955,524, filed on Aug. 13, 2007.

(30) Foreign Application Priority Data

Sep. 11, 2007    (NL) ...................................... 1034363

(51) Int. Cl.
*B62D 35/00*    (2006.01)

(52) U.S. Cl.
USPC ..................................................... 296/180.4

(58) Field of Classification Search
USPC ............. 296/180.1–180.5, 37.6, 90; 180/903; 105/1.1–1.3
See application file for complete search history.

(56) References Cited

U.S. PATENT DOCUMENTS

| 2,605,119 A | 7/1952 | Earnest |
| 4,262,953 A | 4/1981 | McErlane |

(Continued)

FOREIGN PATENT DOCUMENTS

| CA | 2 437 985 | 2/2004 |
| DE | 34 10 296 A1 | 9/1985 |

(Continued)

OTHER PUBLICATIONS

NL Search Report dated Jul. 9, 2008 (and English translation).

(Continued)

*Primary Examiner* — Glenn Dayoan
*Assistant Examiner* — Sunsurraye Westbrook
(74) *Attorney, Agent, or Firm* — Thomas | Horstemeyer, LLP

(57) ABSTRACT

The present invention relates to a device for minimizing the aerodynamic drag that results when tractors, trailers, rigid trucks, lorries, and other vehicles are moving through air. In particular the invention relates to a plate-shaped flow conductor having a front edge, a lower edge, a rear edge and an upper edge. The flow conductor is mountable along the upper edge in a substantially vertical position to a body portion of a pulled vehicle of a vehicle combination of at least two pivotally connected vehicles. When mounted the flow conductor extends at least partially under the body portion in a longitudinal direction of the pulled vehicle. Characteristic for the flow conductor according to the invention is that the flow conductor comprises locally in conjunction with the front edge a thickened portion, which has a streamlined outer contour in a cross section transversally to the front edge.

20 Claims, 19 Drawing Sheets

(56) References Cited

U.S. PATENT DOCUMENTS

| | | | |
|---|---|---|---|
| 4,386,801 A | 6/1983 | Chapman et al. | |
| 4,486,046 A | 12/1984 | Whitney et al. | |
| 4,611,847 A | 9/1986 | Sullivan | |
| 4,640,541 A | 2/1987 | Fitzgerald et al. | |
| 4,746,160 A * | 5/1988 | Wiesemeyer | 296/180.2 |
| 4,991,906 A * | 2/1991 | Fingerle | 296/180.2 |
| 5,171,057 A | 12/1992 | Sharp | |
| 5,280,990 A * | 1/1994 | Rinard | 296/180.1 |
| 6,224,141 B1 | 5/2001 | Brodlo | |
| 6,561,575 B2 | 5/2003 | Fairburn et al. | |
| 6,644,720 B2 * | 11/2003 | Long et al. | 296/180.4 |
| 6,685,256 B1 | 2/2004 | Shermer | |
| 6,786,291 B1 | 9/2004 | Linden et al. | |
| 6,974,178 B2 | 12/2005 | Ortega et al. | |
| 7,093,889 B2 * | 8/2006 | Graham | 296/180.4 |
| 2004/0155485 A1 | 8/2004 | Hamnett | |
| 2004/0256884 A1 | 12/2004 | Schwartz | |
| 2005/0161976 A1 | 7/2005 | Ortega et al. | |

FOREIGN PATENT DOCUMENTS

| | | |
|---|---|---|
| DE | 37 12 048 | 10/1988 |
| DE | 196 14 083 | 10/1997 |
| DE | 199 60 483 A1 | 6/2001 |
| FR | 2 739 826 | 4/1997 |
| JP | 60-72373 | 5/1985 |
| JP | 62-137174 | 8/1987 |
| JP | 63-154726 | 6/1988 |
| JP | 2-24787 | 2/1990 |
| JP | 5-82706 | 11/1993 |
| JP | 2006-36057 A | 2/2006 |
| JP | 3122053 | 5/2006 |
| WO | 97/48590 | 12/1997 |
| WO | 2004/062953 | 7/2004 |

OTHER PUBLICATIONS

PCT Search Report dated Nov. 26, 2008.

* cited by examiner

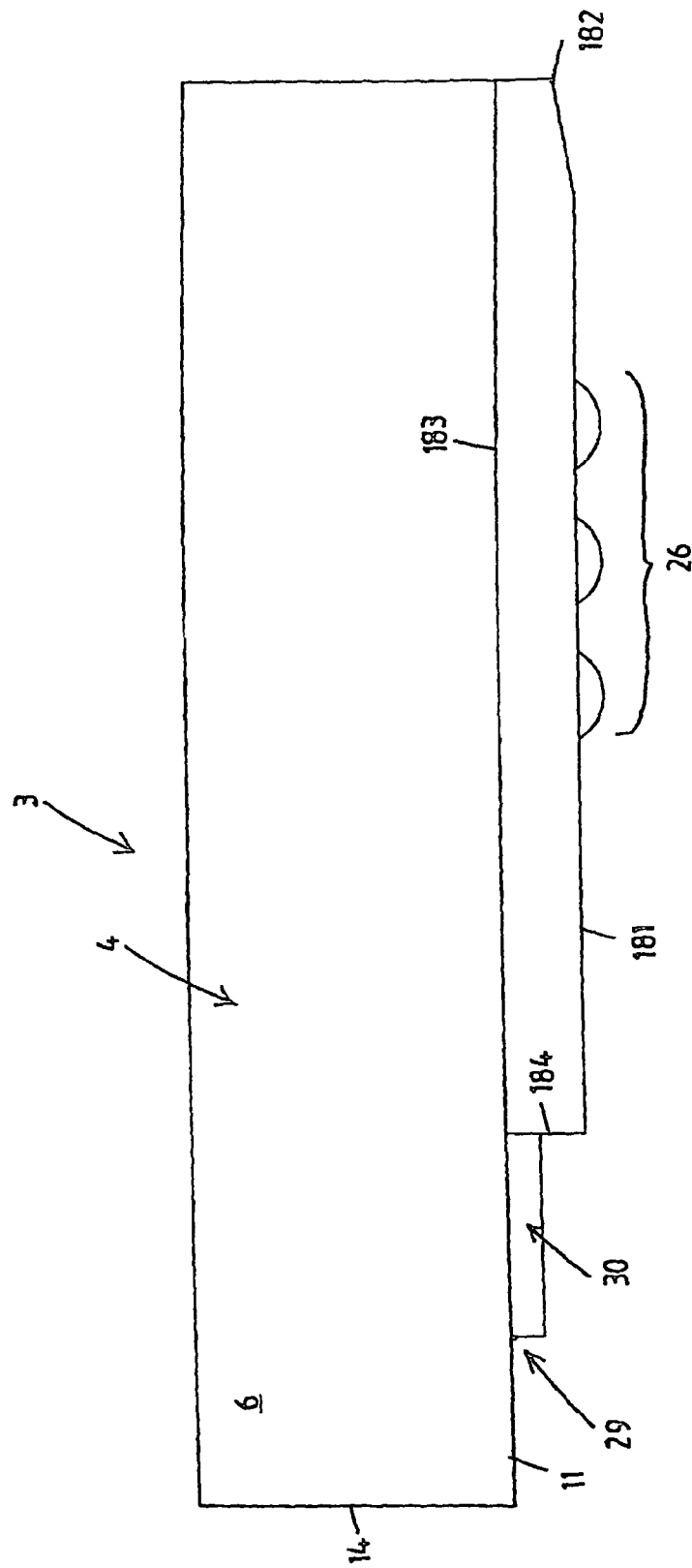

SIDE SKIRT FOR A PULLED VEHICLE

CROSS-REFERENCE TO RELATED APPLICATION

This application is the National Phase of International Application no. PCT/NL2008/000187, filed 4 Aug. 2008, which claims priority to and the benefit of U.S. provisional patent application No. 60/955,524, filed 13 Aug. 2007, and NL patent application no. 1034363, filed 11 Sep. 2007, the contents of which are incorporated by reference as if fully set forth herein.

FIELD OF THE INVENTION

The present invention relates to a flow conductor for minimizing the aerodynamic drag that results when tractors, trailers, rigid trucks, lorries, and other vehicles are moving through air. In particular the invention relates to a plate-shaped flow conductor for use as a side skirt having a front edge, a lower edge, a rear edge and an upper edge. The flow conductor is mountable along the upper edge in a substantially vertical position to an outer lower edge of a body portion of a pulled vehicle of a vehicle combination of at least two pivotally connected vehicles. When mounted the flow conductor extends at least partially at the outside under the body portion in a longitudinal direction of the pulled vehicle. The flow conductor as a side skirt reduces aerodynamic drag, but reduces also noise and spray of rainwater from the wheels.

BACKGROUND

It is a well known fact that the aerodynamic performance of the external shape of a vehicle and its movement through a medium can be defined in a certain non-dimensional quantity called the drag coefficient $C_D$. The drag coefficient at lower speeds of a body is mainly dependent on the aerodynamic configuration of the body and the Reynolds number, which is a measure for the ratio of inertia forces to viscous forces in a flow. The drag coefficient and the corresponding aerodynamic forces are directly related to the driving speed to the second power, and to the fuel consumption, thus the operational economics, of that corresponding vehicle.

Heavy road transport vehicles can be characterized in an aerodynamically sense as bluff shapes. This means that the aerodynamic properties of these road vehicles are strongly influenced by flow separation. Flow separation occurs when the boundary layer, which is a thin layer that bridges the velocity difference between the moving vehicle and the lower air speed, encounters a sufficiently large adverse pressure gradient due to, for instance, abrupt geometrical changes in the body like for instance at the back of bluff road vehicles.

The term bluff most commonly refers to bodies which have leading-edge flow separation, as most vehicles do at large side wind angles. The flow which is touching the front of the vehicle, goes, for instance, along the side of the trailer to the back of the same trailer where it is not able to follow a 270 degrees corner comprising the side and back surfaces. For example the squared edges found at most corners of bulk commercial road and rail cargo carriers. The effects of these flow separations are most apparent in their high aerodynamic drag levels, where the pressure drag component is many times higher due to flow separation than the drag due to skin friction as with airfoils. The aerodynamic drag of a bluff shape is mainly due to the pressure difference of the front and rear faces of the body, with respect to the environment pressure, with only a secondary contribution due to skin friction.

Fuel economy and the associated fuel cost of heavy transport vehicles are very important issues within the operational cost of national and international transport companies. Till this day transportation of goods over the roads is one of the most efficient and flexible methods within the field of freight transportation. A large amount of engine power is required to overcome the aerodynamic forces that are acting on a road vehicle, due to the passage of the vehicle through air. Besides reducing the aerodynamic drag with special designed devices or aerodynamically well streamlined bodies, also other measures may positively effect the fuel consumption of vehicles. For instance by introducing vehicle weight reduction through designing lightweight structures, by improving tire friction coefficients which reduce the tire friction forces and by increasing mechanical efficiency of the mechanical parts like the engine, the gear box and the driving shafts. An improved aerodynamic behaviour of a vehicle will, besides an increased fuel economy, decrease the belch of environmental unfriendly exhaust gasses as well as introducing a more save traffic situation because of the decreased tire wear.

Due to the aerodynamic instabilities in the flow around and in the wake behind the vehicle, the vehicle is bucketing slowly over the road which results in tire wear and possible tire burst and thus an unsafe traffic situation.

As a road vehicle is progressing along its path, the volume of air in the near front of the vehicle actually acts as a frontal barrier which causes stagnation drag and thus a loss in fuel economy. Significant advances have already been made in aerodynamic design of the cabin of the tractor and of trucks in general. Rounded cabin corners, side and roof deflectors, aerodynamic mirrors, and side fenders to close the gab between the cabin and the trailer are commonly adopted. Also several aerodynamic devices for the back end of the vehicle, like the boat tail, splitter plates, guiding vanes, air deflectors, and pneumatic systems, are developed and reduce the total drag of the road vehicle significantly. Since the undercarriage of a trailer usually includes transverse chassis beams, a pallet box, axles, support legs, equipment storage volumes, and other irregular elements, this region is characterized by highly turbulent and separated flows.

The present invention relates to vehicles having highly turbulent regions as a result of an interrupted flow at a position of a pivotal connection between at least two parts of the total vehicle combination. Such turbulent regions for example occur typically at the pivotal connection point between a trailer and a tractor or at the position of the connection by a drawbar of one or multiple lorries to a rigid truck. Another example of a vehicle combination is a railway train comprising a locomotive and several wagons. The locomotive and wagons are all pivotally connected to each other. At each connection, regions occur with large pressure differences. At those positions, the flow along the vehicle is interrupted, which adversely affect the aerodynamic behaviour of the total vehicle combination.

U.S. Pat. No. 6,974,178 to Ortega and Salari illustrates several baffle assemblies adapted to be positioned upstream of the wheel assembly for deflecting airflow away from the wheel assembly so as to reduce the incident pressure on the wheel assembly.

A first embodiment of the apparatus of U.S. Pat. No. 6,974,178 shows a wedge-shape side skirt arrangement. The skirt arrangement is mounted on the underside of the vehicle body portion in front of the rear wheel assembly using fasteners or other mounting hardware of a type known in the relevant arts. The skirt arrangement has right and left panels extending down from the underside of the body portion and angled to deflect airflow away from the rear wheel assembly. It is appreciated, that the left and right panels are part of unitary construction and the leading ends thereof may be integrally connected, either at an angle, or with a curvilinear or otherwise continuous shape. The straight panels themselves may also have a concave or convex curvilinear configuration.

A second embodiment of U.S. Pat. No. 6,974,178 shows a wedge-shaped skirt portion with a left and a right panel similar but shorter than the first embodiment and a third forward panel connected to the wedge-shaped portion at a forward location thereof. This third forward panel is centrally aligned with the longitudinal central axis of the trailer.

A third embodiment is compromising a pair of side-skirts which are mounted parallel at or near the transversely opposite side of the body vehicle. In particular, the side skirts may be directly mounted to the underside of the body portion to extend there below, or mounted to the side of the body portion to extend down to a level below the body portion. The side skirts are located near the left and right side lower edges to impede airflow into and across the underside of the trailer.

A first problem of the first and second embodiment of U.S. Pat. No. 6,974,178 is that units, like the battery box, pallet box, storage volume and other necessary parts, which are present on a regular trailer, can not be mounted anymore due to the present side skirts.

Another problem of the three embodiments of U.S. Pat. No. 6,974,178 is the fact that the underside of the body portion of the vehicle is not accessible if necessary for certain tasks like maintenance or storekeeping of parts and the like.

A further problem of the three embodiments of U.S. Pat. No. 6,974,178 is that there are still zones with a high level of turbulence caused by released flows and felt by the passing flow, which adversely affect the aerodynamic behaviour of the vehicle. Especially when the vehicle is subjected to horizontally inclined flows, eddies and heavy irregularities in the flow are occurring.

SUMMARY

It is an object of the present invention to overcome at least one of the abovementioned drawbacks, at least partially, and/or to provide a usable alternative. In particular, it is an object of the invention to provide an improved streamlined vehicle comprising a flow conductor that guides the flow properly if it is liable to horizontal inclined and straight forward flows. This object is achieved with a flow conductor for use as a side skirt, which is plate-shaped having a front edge, a lower edge, a rear edge and an upper edge, wherein the flow conductor is mountable along the upper edge in a substantially vertical position to a body portion of a pulled vehicle of a vehicle combination of at least two pivotally connected vehicles, and wherein the flow conductor extends at least partially under the body portion in a longitudinal direction along an outer edge of the pulled vehicle.

Characteristic for the flow conductor according to the invention is that the flow conductor comprises locally in conjunction with the front edge a thickened portion, which has a streamlined outer contour in a cross section transversally to the front edge. In a vertically mounted flow conductor an inner and outer surface may be defined. The inner surface is positioned inwards with respect to the pulled vehicle, like a trailer, lorry or wagon. Advantageously according to the invention the airflow which hits the flow conductor at the front edge is conducted in a stable manner in airflows along the inner and outer surface of the flow conductor. The front edge comprises a streamlined outer contour which guides the airflow along the surfaces of the flow conductor. The risk on separation of the airflow at the front edge is strongly reduced.

According to the invention the turbulence of the airflow in the region around the front edge is strongly reduced, which positively affect the aerodynamic performance of the complete vehicle combination. The improved aerodynamic performance has an appreciable effect on the fuel consumption of the vehicle combination. During several tests it has been established that fuel consumption savings of about 5% and more may be achieved with the flow conductor according to the invention.

Herewith the present invention provides a device for reducing aerodynamic drag of a wheeled vehicle in an air stream. This vehicle may be represented as a tractor-trailer combination, where the trailer has several wheel assemblies supporting the vehicle body. Preferably, the aerodynamic device as a drag reduction apparatus for the trailer comprises two panels with a geometry in substantially mirror symmetry and curvatures at the inside at the front vertical edges. The panels are mounted in the longitudinal direction of the trailer beneath a lower outer edge. The panels are side skirts which extend along the sides of the trailer adjacent the ground.

In an alternative embodiment the present invention provides a flow conductor in a device for reducing aerodynamic drag for an alternative wheeled vehicle in an air stream. This vehicle can be described as a rigid truck with a lorry and a drawbar, where the lorry has several wheel assemblies supporting the vehicle body. The drag reduction apparatus for this type of trailer comprises two equal panels with, at the inside curvatures at the front vertical edges. The panels are mounted in the longitudinal direction of the lorry.

In a preferred embodiment of the flow conductor according to the invention the outer contour of the thickened portion in cross-section comprises a curvature with an airfoil part, which is in conjunction with the front edge. The airfoil part is positioned at the front edge of the flow conductor to guide an approaching airflow along the inner and outer side of the flow conductor. Advantageously, the airfoil geometry like a wing profile is optimally suitable to guide the airflow, reduce turbulence and preventing flow separation in a zone around the front edge.

In an alternative embodiment of the flow conductor according to the invention the outer contour comprises a curvature with a circular part having a radius of at least 100 mm which is in conjunction with the front edge. In a further alternative embodiment according to the invention the outer contour comprises a curvature with an elliptical part, which is in conjunction with the front edge. These embodiments are advantageous, because the production of these flow conductors is relatively cost-efficient and the reduction of the turbulence is considerable.

To obtain a relevant reduction of the turbulence, it is important that the thickened portion has suitable dimensions. In a particular embodiment the thickened portion has a height dimension in a direction perpendicular to the outer surface of the flow conductor of at least 50 mm. Preferably the height dimension is 100 mm, in particular 200 mm.

In an embodiment according to the invention the thickened portion of the flow conductor extends through an imaginary plane which is parallel to the outer surface of the flow conductor at a distance of 100 mm. Preferably, the geometry of the front edge is smooth and sharp edges are avoided to prevent the creation of swirls in the guided airflow. It is important that the airflow keeps following the surface of the flow conductor. A continuous flow along the flow conductor must not be interrupted by a sudden change in the geometry of the flow conductor. It also depends on the speed of the airflow, if a change in geometry turns out in an interruption of the continuous airflow. The minimum dimensions of the thickened portion of the flow conductor are in a particular embodiment according to the invention related to the higher speeds of airflow which occur during a ride. The geometry of the thickened portion of the flow conductor may preferably not have abrupt changes and have minimum dimensions. According to the invention it is established that it is advantageous to gradually conduct the airfoil with a thickened portion which is arranged with a minimum dimension in a direction perpendicular of the outer surface of the plate-shaped flow conductor. This minimum dimension is defined as a perpendicular distance between the outer surface of the flow conductor and a parallel positioned imaginary plane. In a preferred embodiment it has been established that it is favorable if the imaginary plane is parallel to the outer surface of the flow conductor at a distance of 200 mm.

In an embodiment according to the invention the mountable plate-shaped flow conductor comprises an inner and an outer surface. When the flow conductor is mounted onto a vehicle, the inner surface is arranged inwards with respect to the pulled vehicle. Advantageously, the thickened portion is positioned at the inner surface of the flow conductor. The outer surface is flat and not equipped with a thickened portion. Herewith, the turbulence in the region around the front edge is considerably reduced.

In an embodiment according to the invention the flow conductor comprises a front and/or rear chamfer between the front edge and the lower edge. These chamfers improve the conduction of the airflow and therefore further improve the aerodynamic performance.

In a particular embodiment the front and/or rear chamfer have a dimension in a direction of the front edge of at least 100 mm. From this minimum dimension a better performance is established.

In a particular embodiment of the flow conductor according to the invention the flow conductor is made of dicyclopentadiene, also known as Telene. This material has a high impact resistance, which is advantageously for reducing damages caused by road metal. Dicyclopentadiene is further advantageous, because it may reduce the total weight of the flowconductor. In addition, it is advantageous that the dicyclopentadiene material allows the manufacture of large 3D geometries in one piece, which allows to integrate the thickened portion in the plate-shaped part of the flow conductor according to the invention.

Further the invention relates to an aerodynamic device comprising a set of two flow conductors which have a corresponding geometry in mirror symmetry.

In an embodiment according to the invention, the flow conductor extends over the whole length of the vehicle to guide an air stream from the front of the vehicle along the underside of the body portion to the back of the vehicle. Advantageously, turbulent zones along the whole length of the vehicle are reduced. Components, like pillars and storage containers which could cause disturbances of the airflow are arranged behind the flow conductor and no longer adversely affect the guided airflow.

It is advantageous to sustain the flow path to the back of the body portion. Herewith also the aerodynamic drag behind the vehicle is reduced. The guidance of air to the back of the vehicle reduces the pressure drop behind the vehicle, which positively affect the aerodynamic performance of the total vehicle combination.

A further embodiment of the present invention comprises a longitudinal flow conductor that can be flapped up along the longitudinal axis of the vehicle in order to guarantee the accessibility of the underside of the vehicle. Preferably, the accessibility of the underside of the body portion of the vehicle is assured via a leaf mechanism as a hinge to which the flow conductor is connected. Herewith, it is also convenient to mount indispensable parts at the underside of the body portion of the same vehicle.

Further the invention relates to an advantageous trailer provided with a flow conductor according to the invention. In a particular embodiment of the trailer according to the invention the flow conductor covers at least partially a wheel of the wheel assembly. Preferably there are cool gaps provided in the flow conductor at a position near the wheel assembly to provide a passage for air to cool the tires and the braking system of the trailer. This reduces the risk of an overheated tire.

Further the invention relates to a vehicle which can be pulled in a vehicle combination, like a lorry or wagon provided with a flow conductor according to the invention. In an embodiment according to the invention the front edge of the flow conductor is substantially aligned with the front surface of the body portion of the lorry or wagon. This is favorable, because in this embodiment turbulence regions are reduced.

Further preferred embodiments are defined in the Detailed Description below and in further dependent claims presented herein.

BRIEF DESCRIPTION OF THE DRAWINGS

The invention will be explained in further detail with reference to the attached drawings which show a practical embodiment of the invention, but which should not be seen as being limiting.

The accompanying drawings, which are incorporated into and form a part of the disclosure, are as follows:

FIG. 18 is a side view of the device of FIG. 17.

DETAILED DESCRIPTION

In the end of this detailed description a legend is presented indicating the names of components with corresponding reference numbers.

The present invention is an aerodynamic drag reduction device to be used with wheeled vehicles of a type generally having a vehicle body portion supported by one or more wheel assemblies located below the body volume where it is exposed to an airflow that contributes to the total drag of the vehicle. The proposed aerodynamic device, which will be named as longitudinal flow conductor, can be applied on different transportation vehicles including automobiles, trains, aircraft or any other vehicle having one or more wheel assemblies located or extending below a body portion of the vehicle which is exposed to airflow resulting in aerodynamic drag.

In FIGS. 1-18 of the drawings and in the following discussion, a conventional trailer of a tractor-trailer combination and a rigid truck with a drawbar and a lorry have been selected as representative wheeled vehicles to illustrate the aerodynamic drag, as well as showcase the solution provided by the various embodiments of the present invention.

Figure 1:
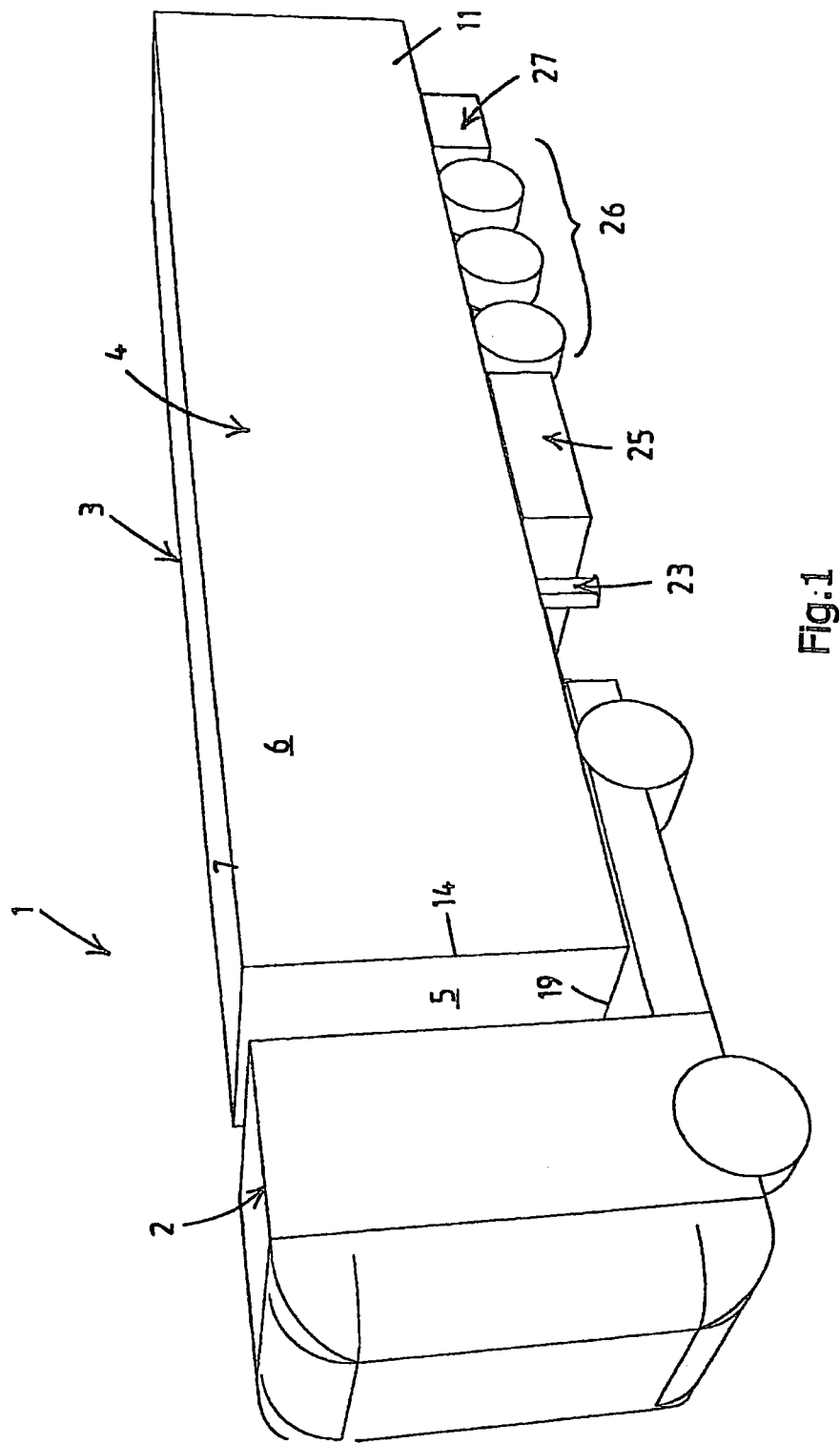
FIG. 1 is a frontal oriented perspective view of one of the vehicles, referred to as a tractor-trailer combination, on which the flow conductor according to the present invention can be mounted.
Figure 2:
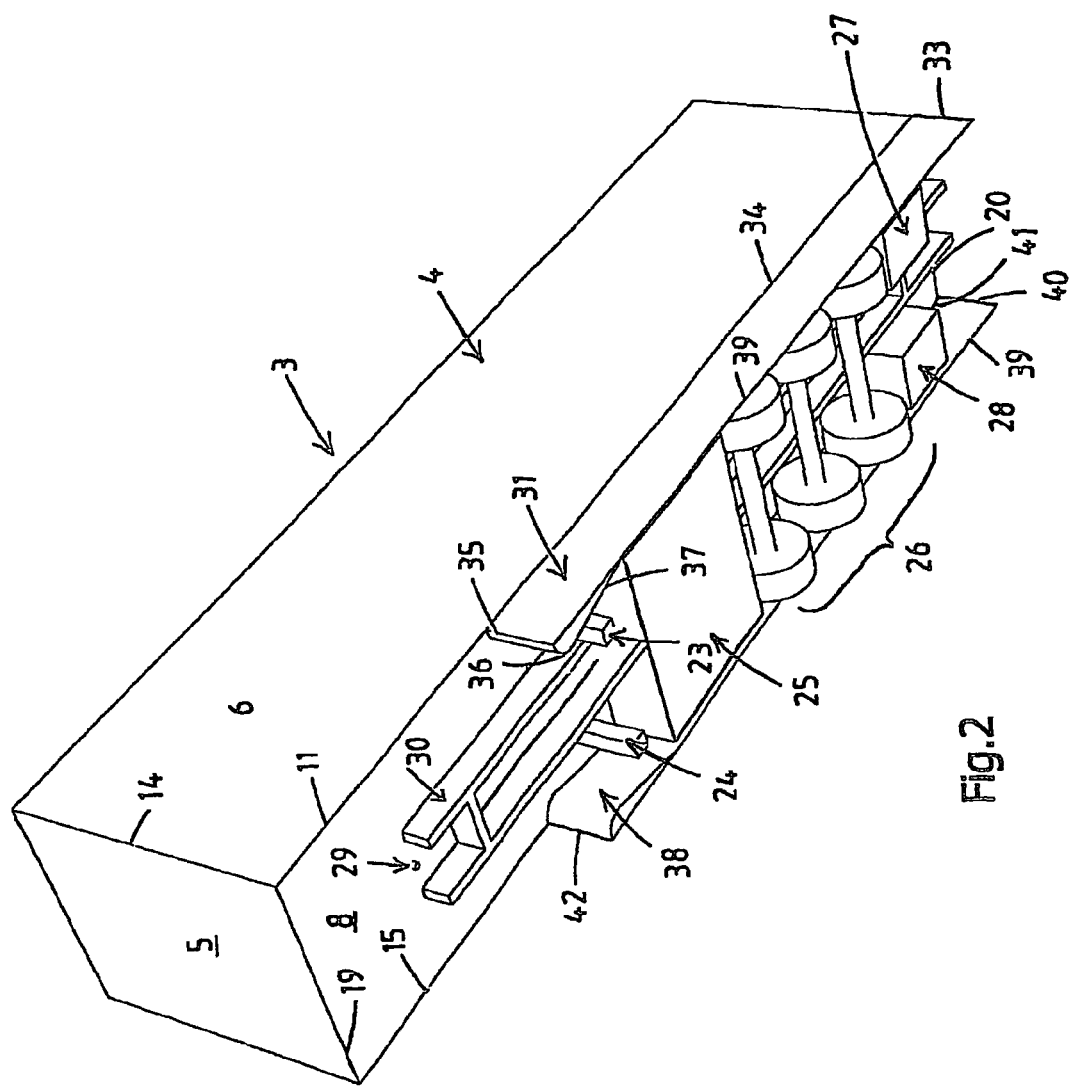
FIG. 2 is an underside oriented perspective view of a first embodiment of the flow conductor according to the invention mounted underneath a trailer of a tractor-trailer combination.
Figure 3:
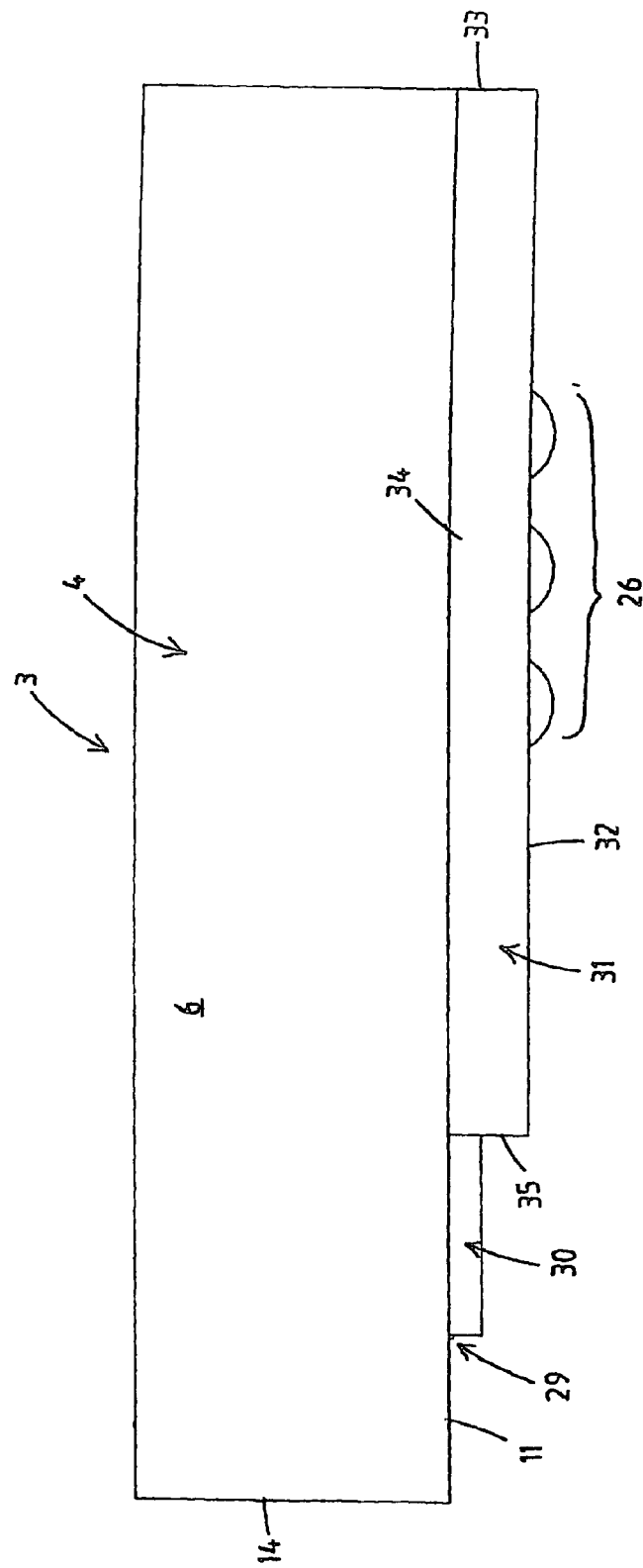
FIG. 3 is a side view of the tractor-trailer of FIG. 1 comprising the flow conductor.

Referring to FIG. 1, a typical tractor-trailer combination 1, indicated generally as the tractor 2 and the trailer 3, is illustrated in perspective view, as observed from an elevated position forward and to the left of the vehicle combination. The tractor 2 is a well known object which is not of interest and will not be described in further detail. The trailer 3, in such a vehicle, travels upon one or more wheel assemblies 26, with its forward end portion pivotally supported by a rear portion of the tractor through the king-pin 29. In order to describe the trailer 3, within the tractor-trailer combination, it is generally configured as a structure enclosing a rectangular body volume 4. This volume has a front surface 5, a left side surface 6, a right side surface 9, a top surface 7, a rear surface 10 and a lower surface 8, a supporting chassis 30, and other equipments, amongst others, indicated generally as left and right supports legs, respectively pillars 23 and 24, a pallet box 25 and possible left and right storage volumes 27 and 28. As used in this detailed description and in the claims, the wheel assembly includes any combination of wheels, (single or double) tires, axles, differentials, and other wheel-related structure, such as struts, shock, springs (or air bellows), control arms, brakes, etc., or any portions thereof, located or extending below the body portion as a unit group. The location as well as the number of the wheel assemblies are not predefined, and are arbitrary. The presence as well as the location of the pallet box 25 and both the storage volumes 27 and 28 are not compulsory and defined.

Figure 5:
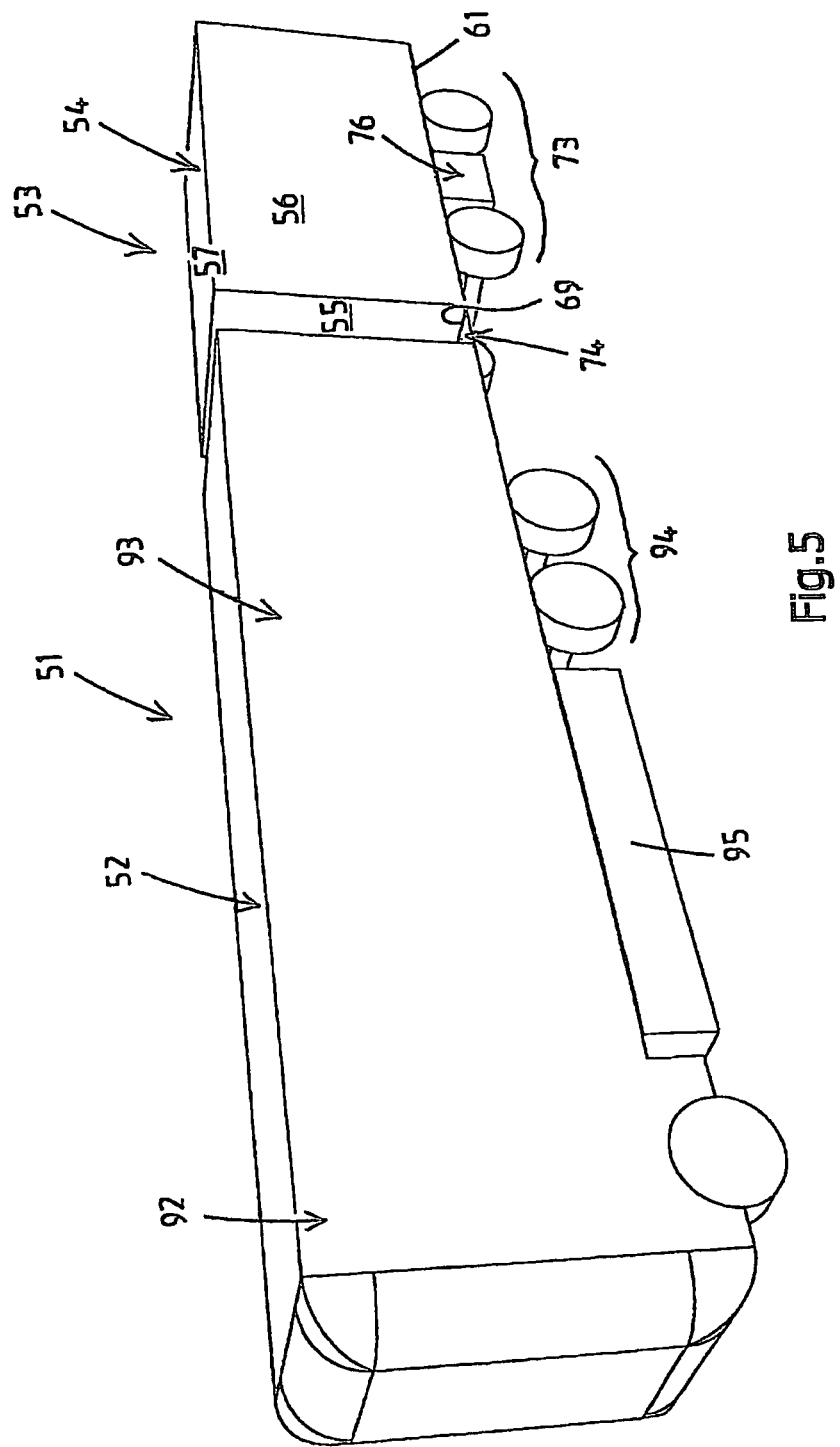
FIG. 5 is a frontal oriented perspective view of one of the vehicles, referred to as rigid truck with a drawbar and a lorry, on which the flow conductor according to the present invention can be mounted.

Referring to FIG. 5, a rigid truck with drawbar and lorry 51, indicated generally as the rigid truck 52 and the lorry 53 with drawbar 74, is illustrated in perspective view, as observed from an elevated position forward and to the left of the vehicle combination. The rigid truck 52 comprises a driver's cabin 92, a body volume 93, multiple wheel assemblies 94 and possible storage volumes 95, for instance, for fuel or electrical units. The lorry 53, in such a vehicle, travels upon one or more wheel assemblies 73, with its forward drawbar 74 pivotally connected by the rear portion of the rigid truck 52 through the king-pin of the same rigid truck 52.

In order to describe the lorry 53, within the rigid truck with drawbar and lorry configuration 51, the lorry is generally configured as a structure enclosing a rectangular body volume 54. This volume has a front surface 55, a left side surface 56, a right side surface 59, a top surface 57, a rear surface 60 and a lower surface 58, a supporting chassis 75, and other equipments, amongst others, indicated generally as possible left and right storage volumes 76 and 77 for the placement of, for instance, electrical units. As used in this detailed description and in the claims, the wheel assembly includes any combination of wheels, (single or double) tires, axles, differentials, and other wheel-related structure, such as struts, shock, springs (or air bellows), control arms, etc., or any portions thereof, located or extending below the body portion as a unit group. The location and the number of the wheel assemblies are not predefined, but are arbitrary.

FIGS. 2-4A show an exemplary first embodiment for a trailer 3 of the present invention having an aerodynamic drag reduction device such as the straight longitudinal flow conductors 31 and 38. The aerodynamic devices can be described as a combination of two thin walled plates with, considering the left longitudinal flow conductor 31, a horizontal lower edge 32, a vertical rear edge 33, a horizontal upper edge 34, and a vertical front edge 35, and, considering the right longitudinal flow conductor 38, a horizontal lower edge 39, a vertical rear edge 40, a horizontal upper edge 41, and a vertical front edge 42. The starting point of the most forward edges, 35 and 42, of both the longitudinal flow conductors, 31 and 38, lies beyond the lower horizontal front edge 19 of the body volume 4 of the trailer 3. The rear edges 33 and 40 of both longitudinal flow conductors, 31 and 38, reach until the lower rear edge 20 of the body volume 4 of the trailer 3. The left and right flow conductors, respectively indicated as 31 and 38, are vertically mounted along its upper edges 34 and 41 to the horizontal outer lower edges 11 and 15 of body volume 4 of the trailer 3. Both the left and right longitudinal flow conductors, 31 and 38, are regarded to be identical in this detailed description, therefore only the left longitudinal flow conductor 31 will be considered further in this detailed description. However, the left and the right longitudinal flow conductors, 31 and 38, can be configured differently with respect to each other, according to the requirements of the user.

Figure 4A:
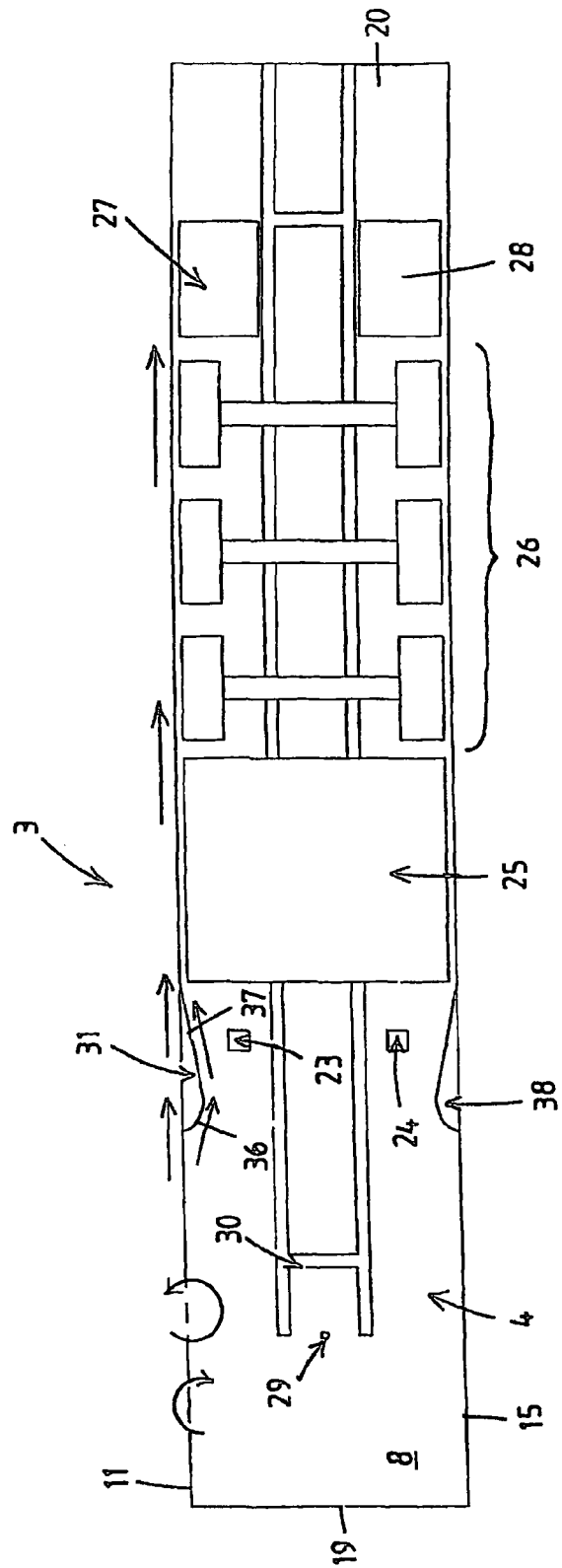
FIG. 4A is a bottom view of the trailer out of FIG. 3 as a pulled vehicle.

The straight front edge 35 of the device splits the flow, that comes from the side and the rear of the tractor 2, into two different flows; one at the outside and one at the inside of the trailer 3. As FIG. 4A indicates that the flow at the outside of the device is guided along the pillar 23, the pallet box 25 (if present), along the wheels assemblies 26 and along the storage volume 27 (if present) to the rear of the trailer 3. At the inside of the front of the aerodynamic device, as can be seen in FIG. 4A, the flow comes along a curvature 36 and a sloping edge 37 preventing the same flow from separating, which reduces the aerodynamic drag locally of the vehicle, and accelerates this inside flow, due to the curvature 36, creating an underpressure. This curvature 36 can be defined as a quarter of an ellipse with a gradually sloping back end 37, as indicated in FIG. 4A. This elliptical curvature with sloping back end will be referred to as elliptical longitudinal flow conductor. The favorable pressure gradient of the profile decelerates the flow again and guides it to the rear of the vehicle, where the flow is expanded into the wake of the vehicle decreasing the underpressure in the wake and thus reducing the aerodynamic drag at the back of the trailer 3.

Figure 4B:
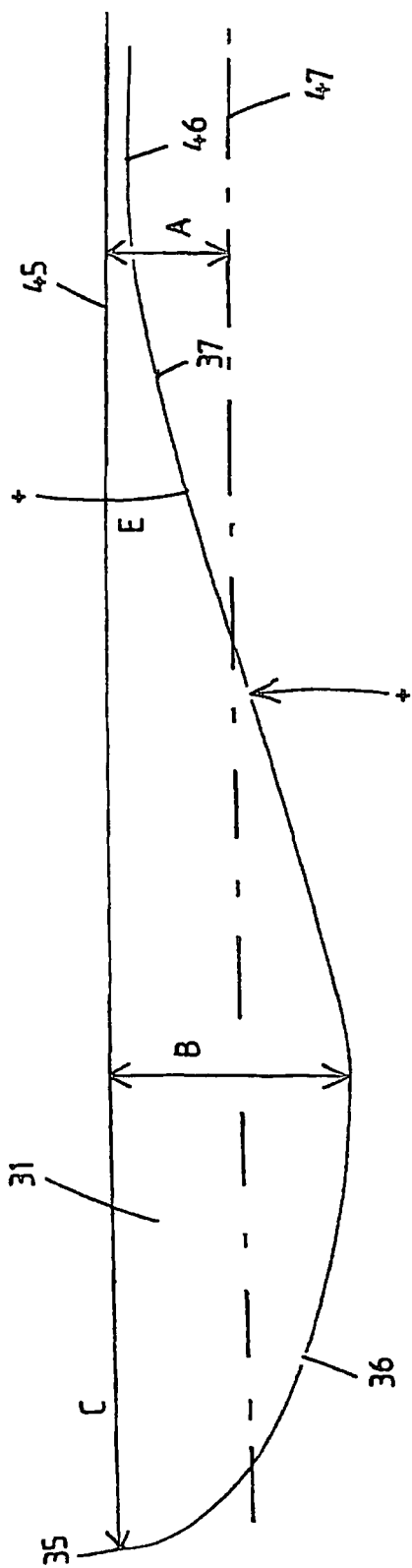
FIG. 4B is a bottom view in detail of the flow conductor out of FIG. 4A focussing on the geometry of the region adjacent the front edge of the flow conductor.

FIG. 4B shows a view in detail of the flow conductor out of FIG. 4A. The detailed view is focussed on the geometry of the region adjacent to the front edge 35 of the flow conductor 38. The flow conductor is plate shaped having a thickness of at least 5 mm. The region adjacent to the front edge 35 of the flow conductor is thickened and is characterised by the fact that it comprises a curvature 36 defining an elliptical surface. The elliptical curvature 36 is defined by two radii "c" and "b". Preferably the ratio of 'c' over 'b' is between at least 1 and at most 3. More preferably the ratio 'c' over 'b' is at most 1.5. A ratio of about 1 defines a circular curvature 36 in the cross section transversely over the flow conductor. The height dimension of the thickened portion in conjunction with the front edge is formed by the dimension 'b'. The dimension 'b' is in a direction perpendicular to the longitudinal direction of the flow conductor. Preferably this dimension 'b' is at least 50 mm, in particular 100 mm, but even more preferable is a height dimension of 200 mm.

With a height dimension of at least 50 mm the thickened portion extends through an imaginary plane 47 parallel to an outer surface 45 of the flow conductor. The substantially flat surface over the substantially full length at the outer side of the flow conductor defines the outer surface 45. Most embodiments of the flow conductor comprise at the inner side an inner surface which is parallel to the outer surface. However, in a particular embodiment according to the invention only a thickened portion may be provided at the inner side or outer side of the flow conductor. The imaginary plane 47 is positioned parallel to the outer surface at a distance 'a' of at least 100 mm at the innerside of the flow conductor.

The thickened portion in FIG. 4B is in cross section defined by the elliptical curvature 36 and the reducing curvature 37. Along the reducing curvature 37, the thickened portion is reduced to the thickness of the plate shaped flow conductor. In FIG. 4B the curvature 36 comprises at least two radii 'd' and 'e' of at least 100 mm. The geometry of the thickened portion ensures a stable guidance of the airflow in a longitudinal direction.

To obtain a streamlined outer contour, the thickened portion, comprising the curvature and the decaying part, preferably extends in a longitudinal direction of the flow conductor over a distance of at least 100 mm.

Figure 6:
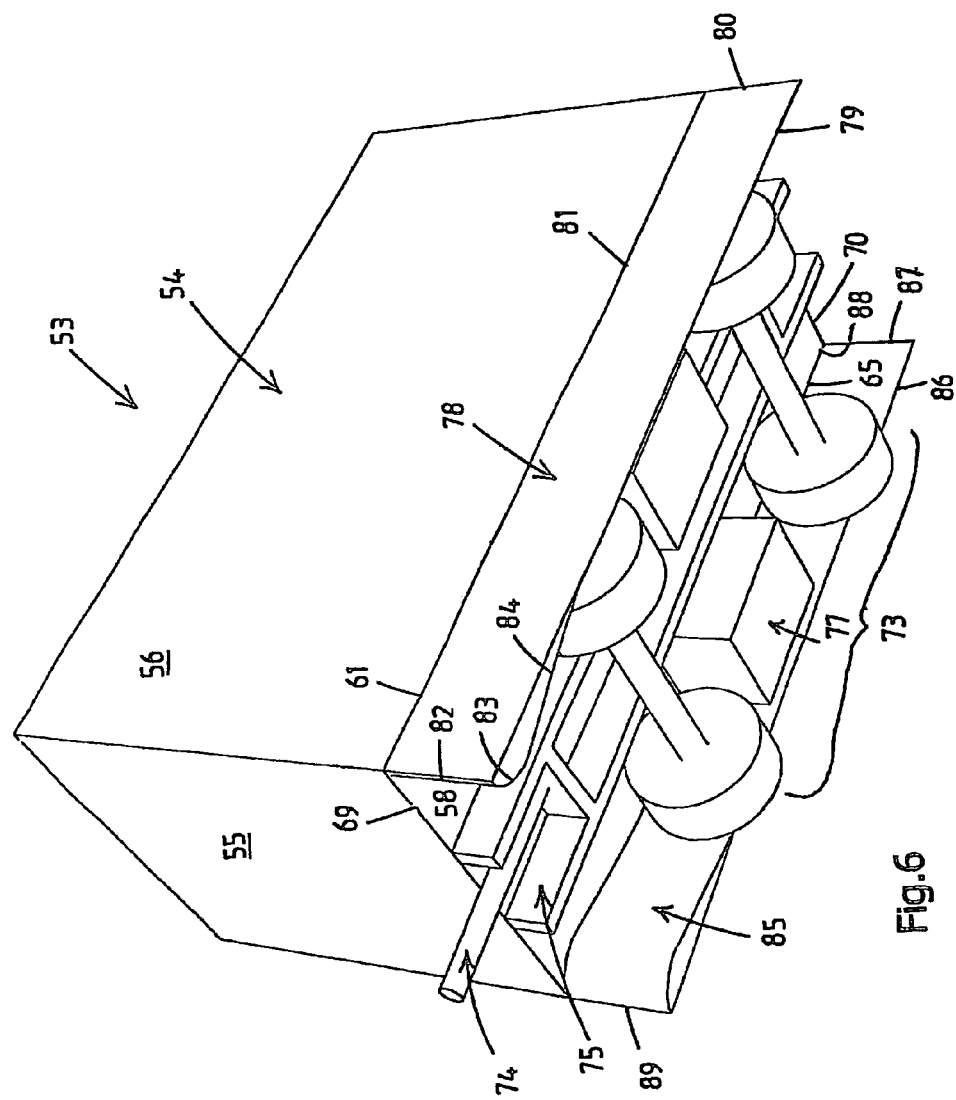
FIG. 6 is an underside oriented perspective view of a first embodiment of the flow conductor of the present invention mounted underneath a lorry of the rigid truck with drawbar and lorry.
Figure 7:
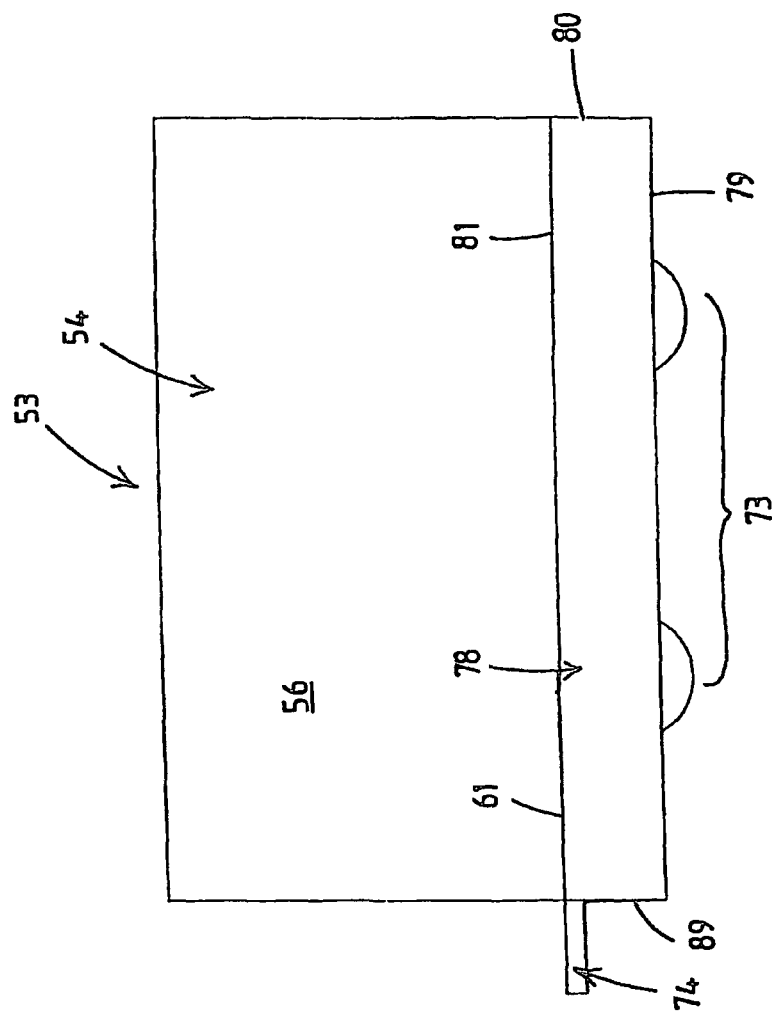
FIG. 7 is a side view of the device of FIG. 6.
Figure 8:
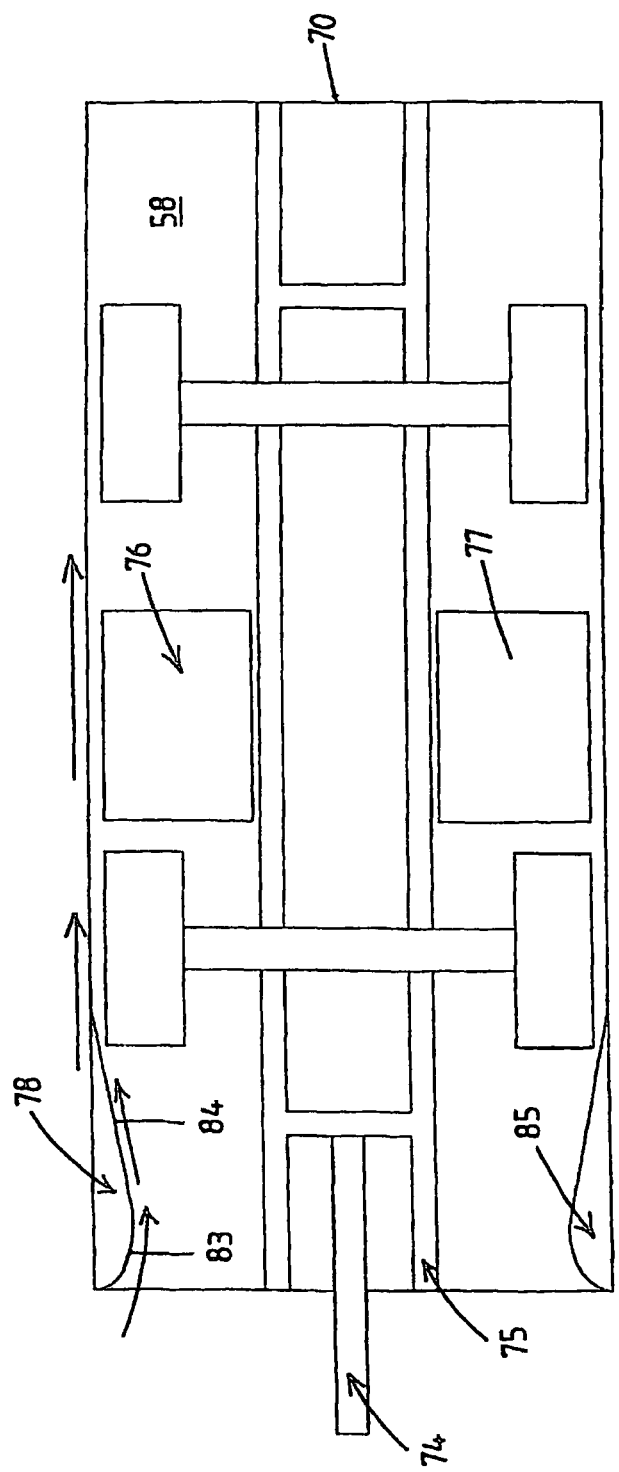
FIG. 8 is a bottom view of the device of FIG. 6.

FIGS. 6-8 show the first embodiment for a lorry 53, within the vehicle known as a rigid truck with a drawbar and lorry 51, of the device of the present invention having an aerodynamic drag reduction device such as the straight longitudinal flow conductors 78 and 85. The aerodynamic devices can be described as a combination of two thin walled plates with, considering the left longitudinal flow conductor 78, a horizontal lower edge 79, a vertical rear edge 80, a horizontal upper edge 81, and a vertical front edge 82, and, considering the right longitudinal flow conductor 85, a horizontal lower edge 86, a vertical rear edge 87, a horizontal upper edge 88, and a vertical front edge 89. The starting point of the most forward edges, 82 and 89, of both the longitudinal flow conductors, 78 and 85, lies at the lower horizontal edge 69 of the body volume 54 of the lorry 53. The rear edges 80 and 87 of both longitudinal flow conductors, 78 and 85, reach until the lower rear edge 70 of the body volume 54 of the lorry 53. The left and right flow conductors, respectively indicated as 78 and 85, are mounted vertically along its upper edges 81 and 88 to the horizontal lower edges 61 and 65 of body volume 54 of the lorry 53. Both the left and right longitudinal flow conductors, 78 and 85, are regarded to be identical in this detailed description, therefore only the left longitudinal flow conductor 78 will be considered further in this detailed description. However, the left and the right longitudinal flow conductors, 78 and 85, can be configured differently with respect to each other according to the requirements of the user.

The straight front edge 82 of the device splits the flow, coming from the side and the rear of the rigid truck 52, into two different flows; one at the outside and one at the inside of the lorry 53. As FIG. 8 indicates the flow at the outside of the device is guided along the wheel assemblies 73 and along the storage volume 76 (if present) to the rear of the lorry 53. At the inside front of the aerodynamic device, as can be seen in FIG. 8, the flow comes along a curvature 83 and a sloping edge 84 preventing the same flow of separating, which reduces the aerodynamic drag locally of the vehicle, and accelerates this inside flow, due to the curvature 83, creating an underpressure. This curvature 83 can be defined as a quarter of an ellipse with a gradually sloping back end 84, as indicated in FIG. 8. This elliptical curvature with sloping back end will be referred to as elliptical longitudinal flow conductor. The favorable pressure gradient of the profile decelerates the flow again and guides it to the rear of the vehicle, where the flow is expanded into the wake of the vehicle decreasing the underpressure in the wake and thus reducing the aerodynamic drag at the back of the lorry 53.

The subsequent embodiments can be preferably utilized on both vehicles, described above, commonly known as a trailer 3 and a lorry 53 with a drawbar 74. The vehicle set-up referred to as a trailer 3 will be further considered in this detailed description.

Figure 9:
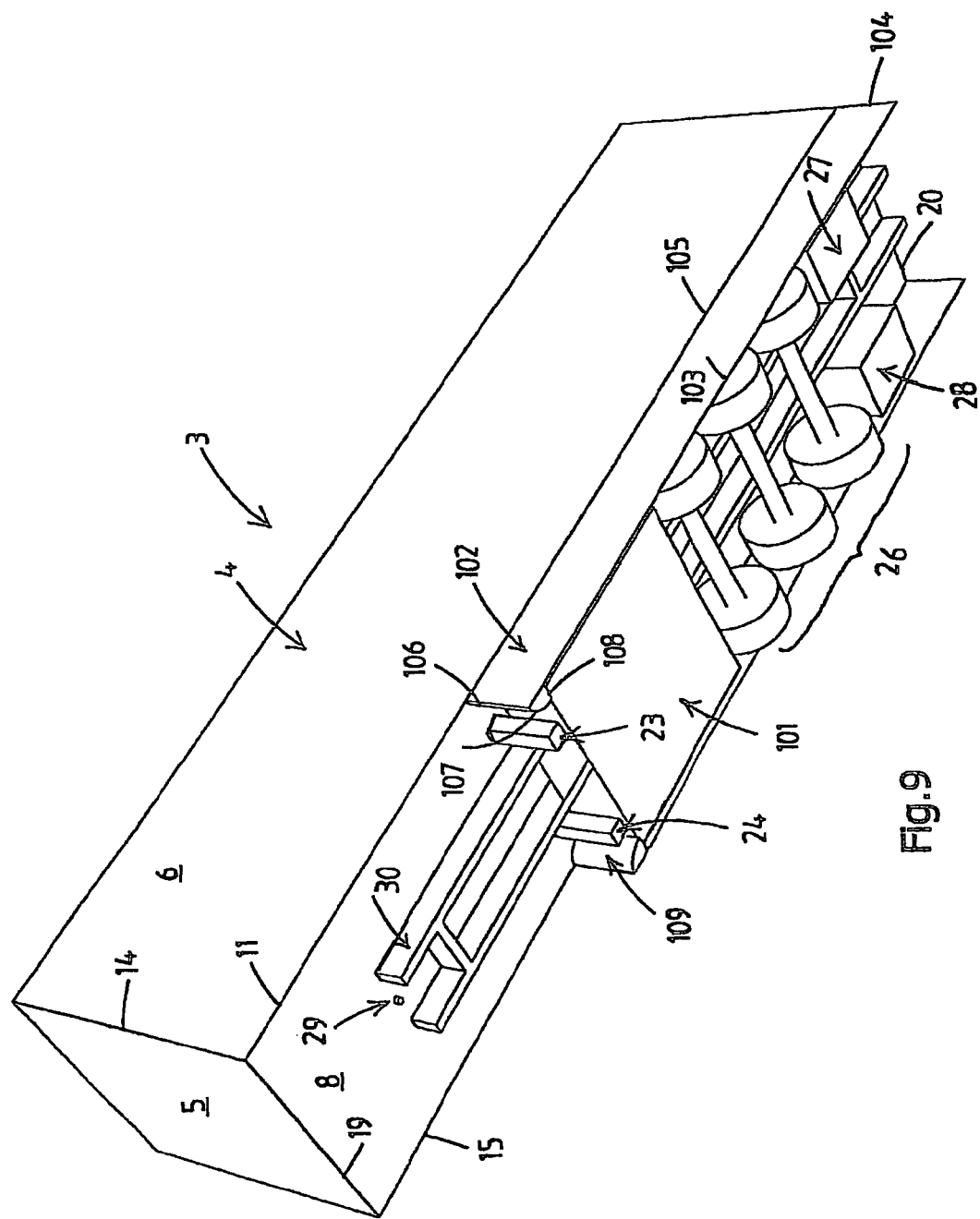
FIG. 9 is an underside oriented perspective view of a second embodiment of the apparatus of the present invention mounted underneath a trailer of a tractor-trailer combination.
Figure 10:
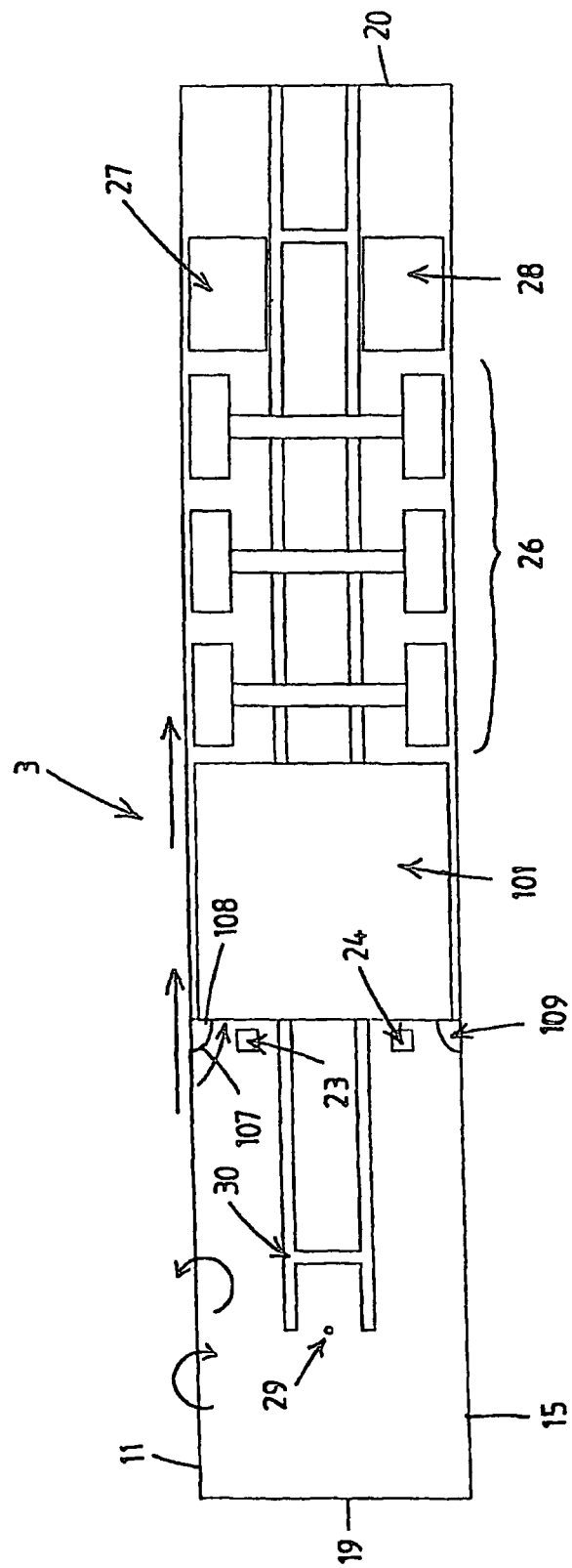
FIG. 10 is a bottom view of the device of FIG. 9.

In FIGS. 9 and 10 an exemplary second embodiment of the present invention is shown, generally indicated at reference characters 102 and 109, and having an aerodynamic drag reduction device such as the longitudinal flow conductors with a back step. The aerodynamic devices comprise a combination of two thin walled plates with, considering only the left longitudinal flow conductor 102, a horizontal lower edge 103, a vertical rear edge 104, a horizontal upper edge 105, and a vertical front edge 106. The starting point of the most forward edge 106 the longitudinal flow conductors 102 lies beyond the lower horizontal edge 19 of the body volume 4 of the trailer 3. The rear edge 104 of longitudinal flow conductor 102 reaches until the lower rear edge 20 of the body volume 4 of the trailer 3. The longitudinal flow conductor with a back step, indicated as 102, is mounted vertically along its upper edge 105 to the vertical lower edge 11 of body volume 4 of the trailer 3.

The straight front edge 106 of the device splits the flow, coming from the side and the rear of the tractor 2, into two different flows; one at the outside and one at the inside of the trailer 3. As FIG. 10 indicates the flow at the outside of the device is guided along the pillar 23, the large pallet box 101, over the wheels assemblies 26 and along the storage volume 27 (if present) to the rear of the trailer 3. At the inside front of the aerodynamic device, as can be seen in FIG. 10, the flow comes along a curvature 107 and a back step 108, which creates room for the pallet box 101. This curvature 107 can be defined as a quarter of an ellipse with a straight back step 108, as indicated in FIG. 10. This curvature with back step will be referred to as longitudinal flow conductor with back step.

Figure 11:
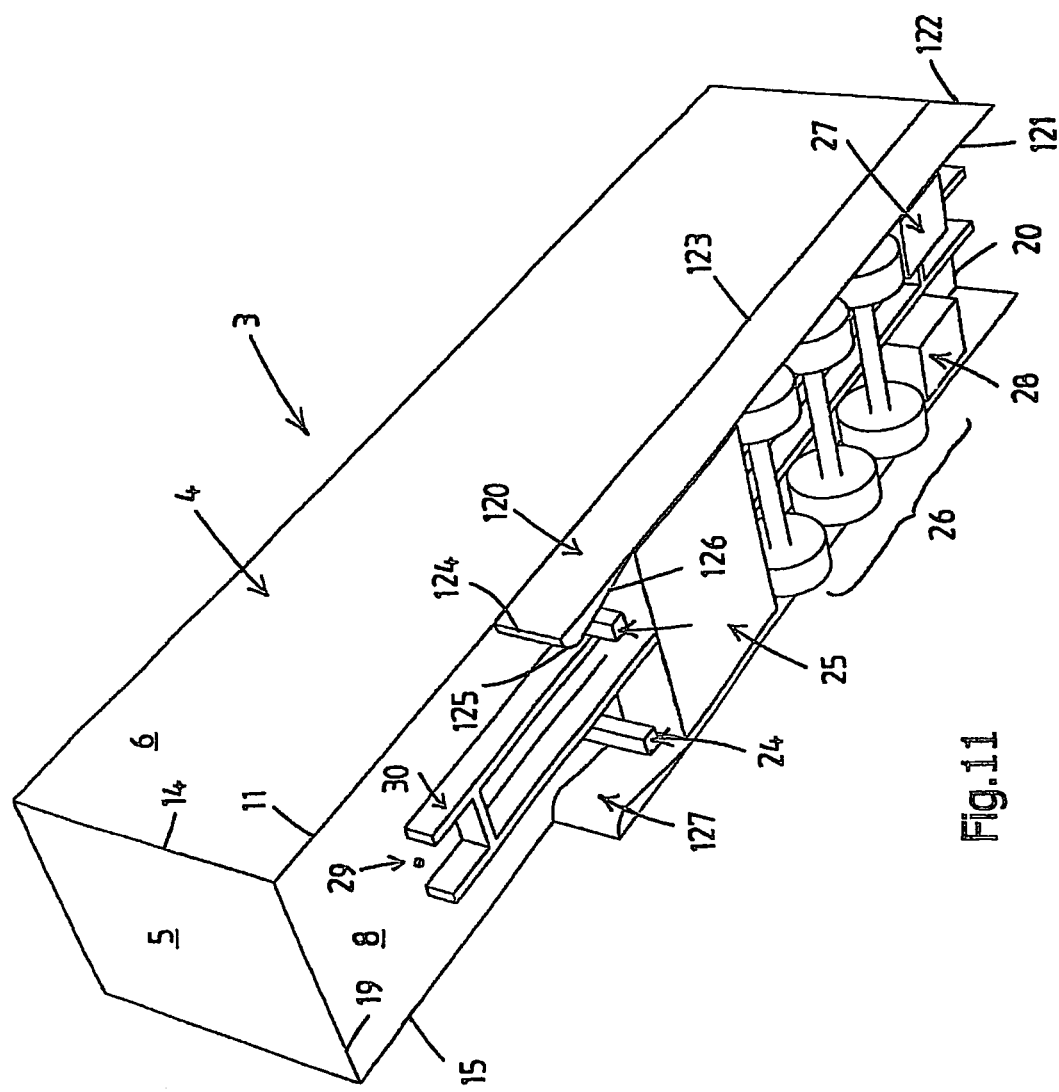
FIG. 11 is an underside oriented perspective view of a third embodiment of the apparatus of the present invention mounted underneath a trailer of a tractor-trailer combination.
Figure 12:
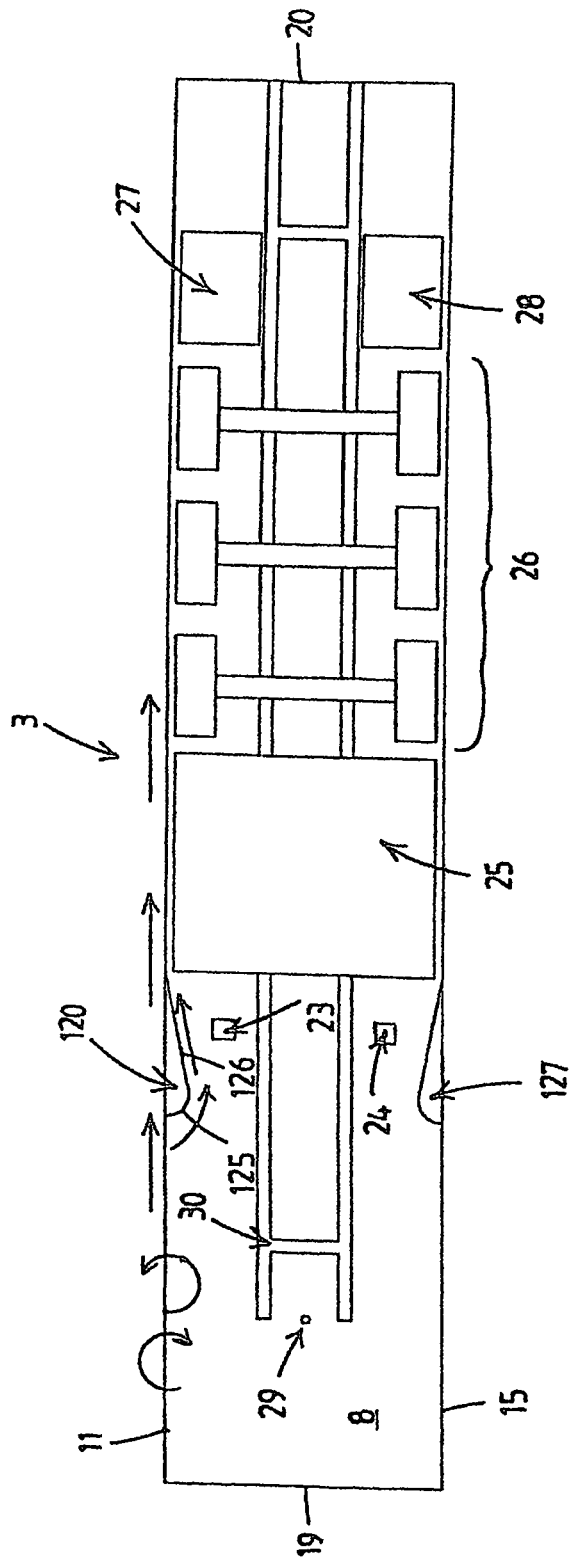
FIG. 12 is a bottom view of the device of FIG. 11.

In FIGS. 11 and 12 an exemplary third embodiment of the present invention is shown, generally indicated with reference numbers 120 and 127, and having an aerodynamic drag reduction device such as the longitudinal flow conductors with a circular curvature. The aerodynamic devices comprise a combination of two thin walled plates with, considering only the left longitudinal flow conductor 120, a horizontal lower edge 121, a vertical rear edge 122, a horizontal upper edge 123, and a vertical front edge 124. The starting point of the most forward edge 124 of the longitudinal flow conductors 120 lies beyond the lower horizontal edge 19 of the body volume 4 of the trailer 3. The rear edge 122 of longitudinal flow conductor 120 reaches until the lower rear edge 20 of the body volume 4 of the trailer 3. The flow conductor, indicated as 120, is mounted horizontally along its upper edge 123 to the horizontal lower edge 11 of body volume 4 of the trailer 3.

The straight front edge 124 of the device splits the flow, coming from the side and the rear of the tractor 2, into two different flows; one at the outside and one at the inside of the trailer 3. As FIG. 12 indicates the flow at the outside of the device is guided along the pillar 23, the large pallet box 25, over the wheels assemblies 26 and along the storage volume 27 (if present) to the rear of the trailer 3. At the inside front of the aerodynamic device, as can be seen in FIG. 12, the flow comes along a curvature 125 and a sloping edge 126 preventing the same flow of separating, which reduces the aerodynamic drag locally of the vehicle, and accelerates this inside flow, due to the curvature 125, creating an underpressure. This curvature 125 can be defined as a quarter of a circle with a gradually sloping back end 126, as indicated in FIG. 12. This circular curvature will be referred to as circular longitudinal flow conductor. The favorable pressure gradient of the circular flow conductor decelerates the flow again and guides it to the rear of the vehicle, where the flow is expanded into the wake of the vehicle increasing the pressure in the wake and thus also reducing the aerodynamic drag at the back of the trailer 3.

Figure 13:
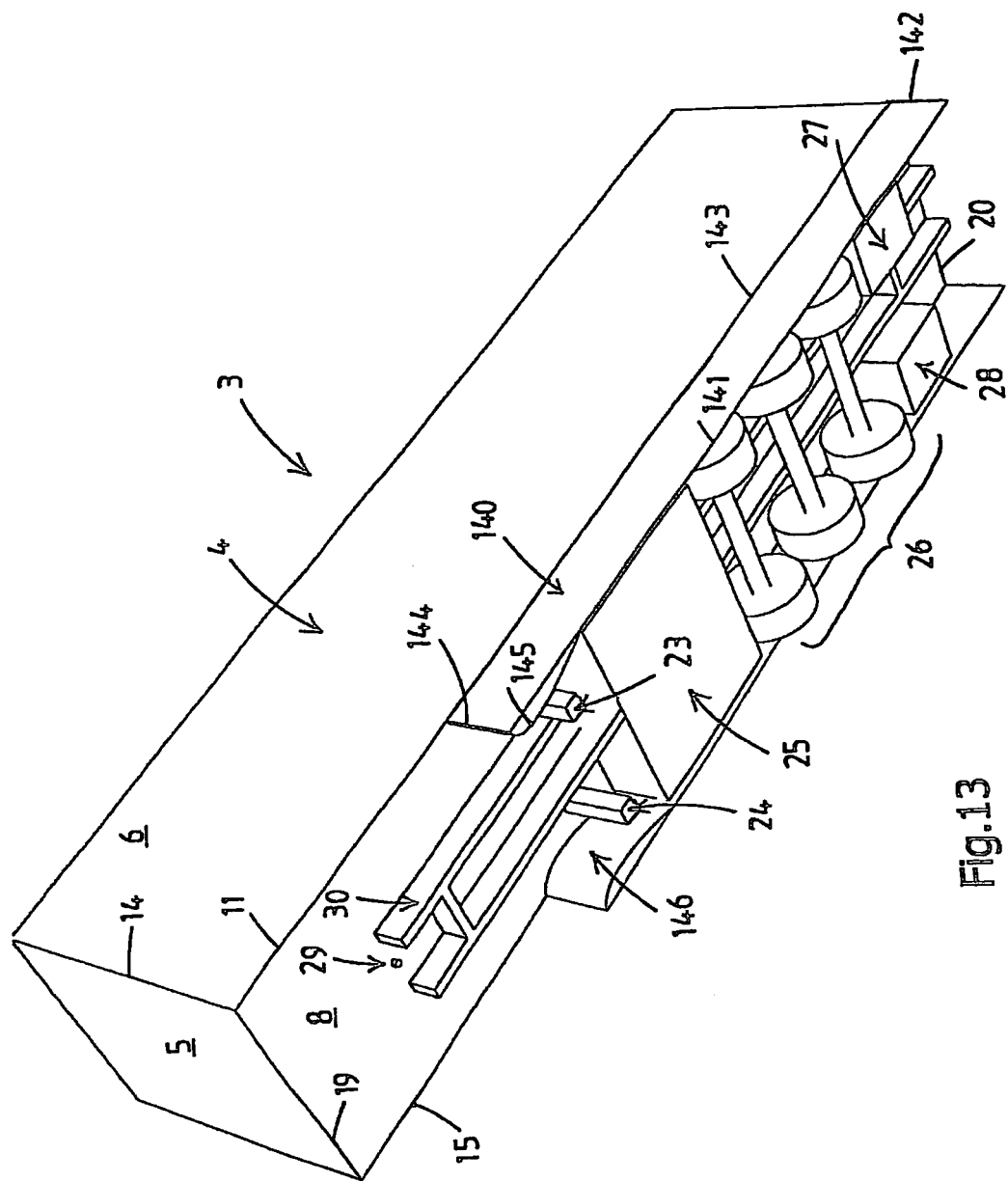
FIG. 13 is an underside oriented perspective view of a fourth embodiment of the apparatus of the present invention mounted underneath a trailer of a tractor-trailer combination.
Figure 14:
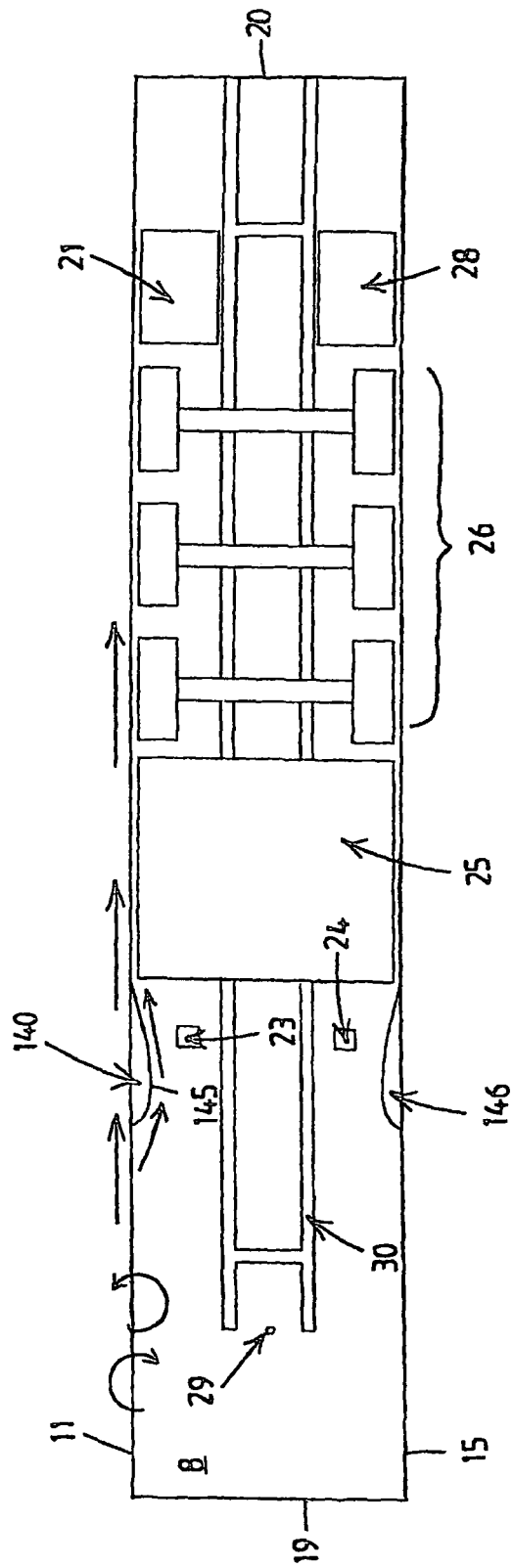
FIG. 14 is a bottom view of the device of FIG. 13.

In FIGS. 13 and 14 an exemplary fourth embodiment of the present invention is shown, generally indicated at reference characters 140 and 146, and having an aerodynamic drag reduction device such as the longitudinal flow conductors with an airfoil curvature. The aerodynamic devices comprise a combination of two thin walled plates with, considering only the left longitudinal flow conductor 140, a horizontal lower edge 141, a vertical rear edge 142, a horizontal upper edge 143, and a vertical front edge 144. The starting point of the most forward edge 144 of the longitudinal flow conductors 140 lies beyond the lower horizontal edge 19 of the body volume 4 of the trailer 3. The rear edge 142 of longitudinal flow conductor 140 reaches until the lower rear edge 20 of the body volume 4 of the trailer 3. The flow conductor, indicated as 140, is mounted vertically along its upper edge 143 to the vertical lower edge 11 of body volume 4 of the trailer 3.

The straight front edge 144 of the device splits the flow, coming from the side and the rear of the tractor 2, into two different flows; one at the outside and one at the inside of the trailer 3. As FIG. 14 indicates the flow at the outside of the device is guided along the pillar 23, the large pallet box 25, over the wheels assemblies 26 and along the storage volume 27 (if present) to the rear of the trailer 3. At the inside front of the aerodynamic device, as can be seen in FIG. 14, the flow comes along a curvature 145 preventing the same flow of separating, which reduces the aerodynamic drag locally of the vehicle, and accelerates this inside flow, due to the curvature 145, creating an underpressure. This curvature 145 can be defined as any kind of airfoil, as indicated in FIG. 14. This airfoil based curvature will be referred to as an airfoil based longitudinal flow conductor. The favorable pressure gradient of the airfoil based flow conductor decelerates the flow again and guides it to the rear of the vehicle, where the flow is expanded into the wake of the vehicle decreasing the underpressure in the wake and thus also reducing the aerodynamic drag at the back of the trailer 3.

Figure 15:
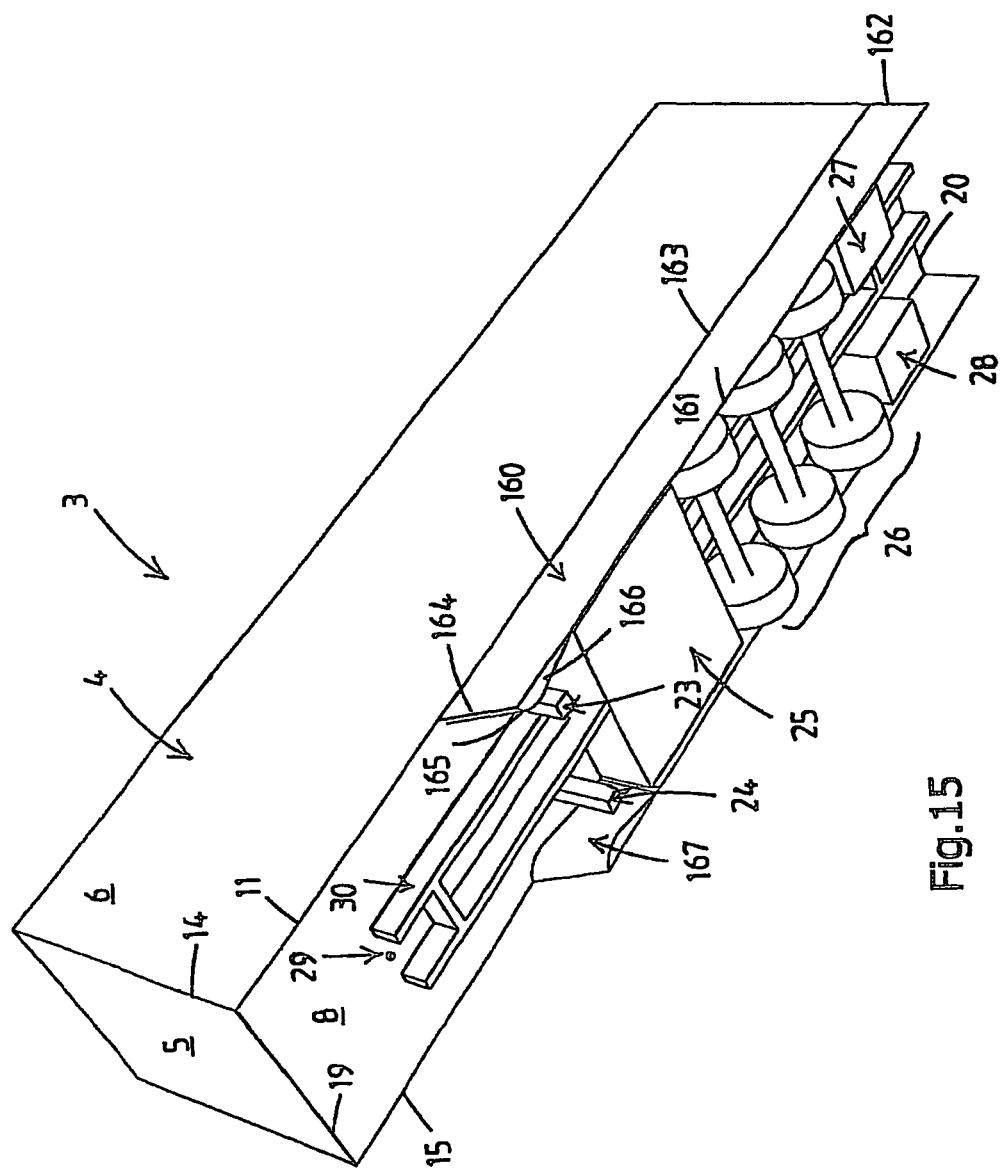
FIG. 15 is an underside oriented perspective view of a fifth embodiment of the apparatus of the present invention mounted underneath a trailer of a tractor-trailer combination.
Figure 16:
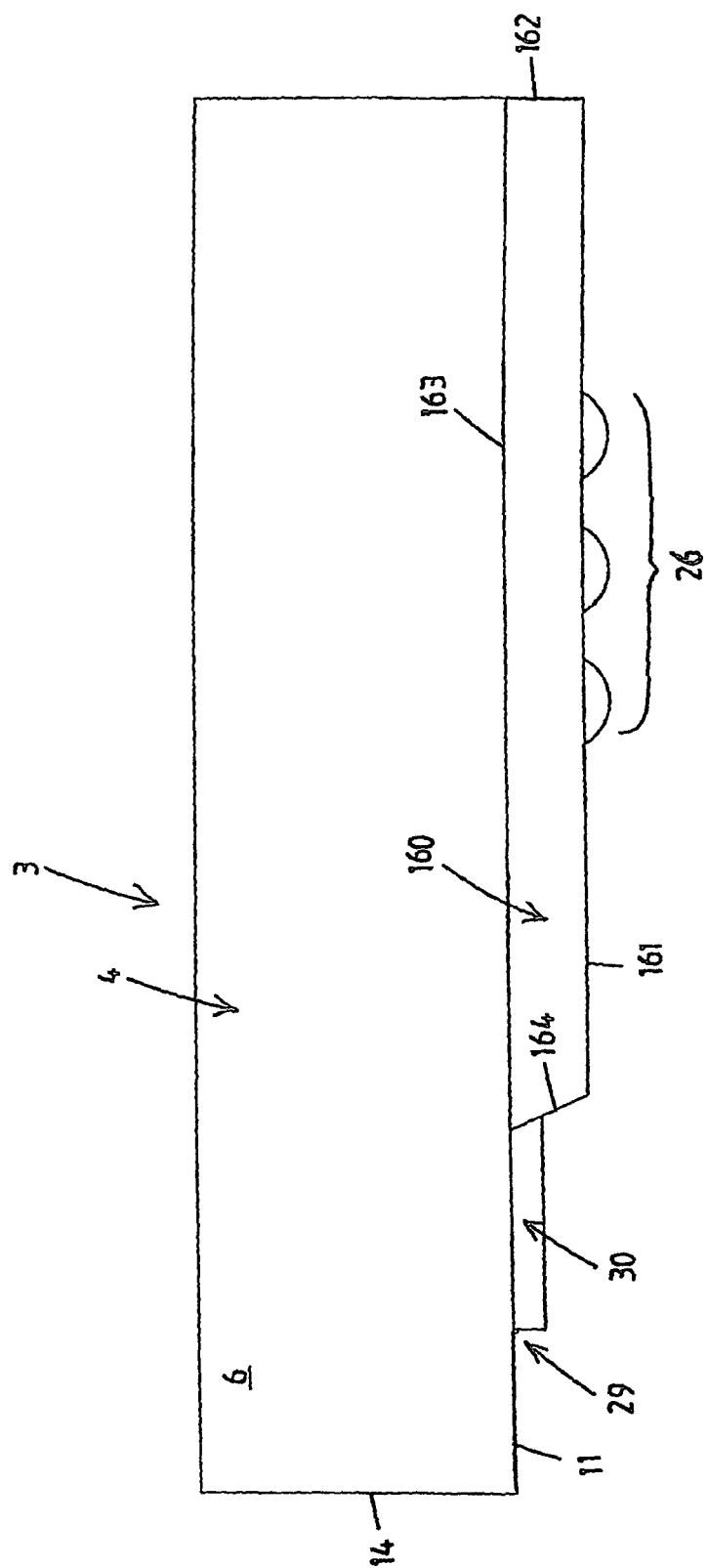
FIG. 16 is a side view of the device of FIG. 15.

FIGS. 15 and 16 shows an exemplary fifth embodiment for a trailer 3 of the device of the present invention having an aerodynamic drag reduction device such as the longitudinal flow conductors 160 and 167. The aerodynamic devices can be described as a combination of two thin walled plates with, considering the left longitudinal flow conductor 160, a horizontal lower edge 161, a vertical rear edge 162, a horizontal upper edge 163, and a chamfered edge 164 between the lower edge 161 and a vertical edge. The starting point of the most forward chamfered edge 164 of the longitudinal flow conductors 160 lies beyond the lower horizontal edge 19 of the body volume 4 of the trailer 3. The vertical rear edge 162 of longitudinal flow conductor 160 reaches until the lower rear edge 20 of the body volume 4 of the trailer 3. The flow conductor, indicated as 160, is mounted vertically along its upper edge 163 to the vertical lower edge 11 of body volume 4 of the trailer 3.

The chamfered front edge 164 of the device splits the flow, coming from the side and the rear of the tractor 2, into two different flows; one at the outside and one at the inside of the trailer 3. The flow at the outside of the device is guided along the pillar 23, the pallet box 25 (if present), over the wheels assemblies 26 and along the storage volume 27 (if present) to the rear of the trailer 3. At the inside front of the aerodynamic device, as can be seen in FIG. 15, the flow comes along a curvature 165 and a sloping edge 166 preventing the same flow of separating, which reduces the aerodynamic drag locally of the vehicle, and accelerates this inside flow, due to the curvature 165, creating an underpressure. The favorable pressure gradient of the profile decelerates the flow again and guides it to the rear of the vehicle, where the flow is expanded into the wake of the vehicle decreasing the underpressure in the wake and thus also reducing the aerodynamic drag at the back of the trailer 3. As FIG. 16 indicates that the front edge 164 of the longitudinal flow conductor is inclined under a certain angle with respect to the horizontal resulting in a higher efficiency during side wind conditions. This chamfered edge 164, to which any angle or outline required by the user can be assigned, will be referred to as longitudinal flow conductor with chamfered front.

Figure 17:
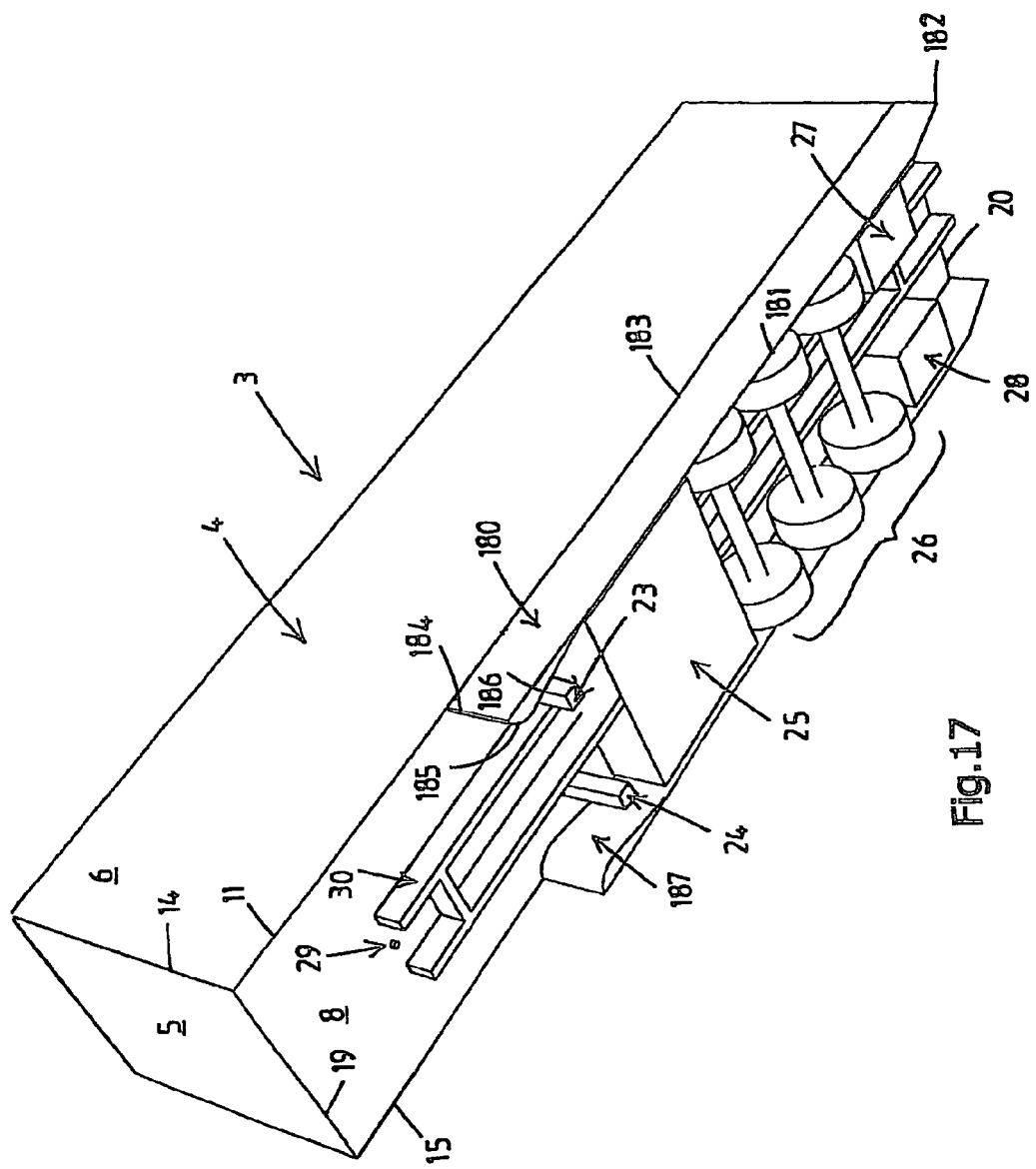
FIG. 17 is an underside oriented perspective view of a sixth embodiment of the apparatus of the present invention mounted underneath a trailer of a tractor-trailer combination.

FIGS. 17 and 18 shows an exemplary sixth embodiment for a trailer 3 of the device of the present invention having an aerodynamic drag reduction device such as the longitudinal flow conductors 180 and 187. The aerodynamic devices can be described as a combination of two thin walled plates with, considering the left longitudinal flow conductor 180, a horizontal lower edge 181, a chamfered rear edge 182 between the lower edge 181 and a vertical edge, a horizontal upper edge 183, and a vertical front edge 184. The starting point of the most forward vertical edge 184 of the longitudinal flow conductors 160 lies beyond the lower horizontal edge 19 of the body volume 4 of the trailer 3. The chamfered rear edge 182 of longitudinal flow conductor 180 reaches until the lower rear edge 20 of the body volume 4 of the trailer 3. The flow conductor, indicated as 180, is mounted vertically along its upper edge 183 to the vertical lower edge 11 of body volume 4 of the trailer 3.

The vertical front edge 184 of the device splits the flow, coming from the side and the rear of the tractor 2, into two different flows; one at the outside and one at the inside of the trailer 3. The flow at the outside of the device is guided along the pillar 23, the pallet box 25 (if present), along the wheels assemblies 26 and along the storage volume 27 (if present) to the rear of the trailer 3. At the inside front of the aerodynamic device, the flow comes along a curvature 185 and a sloping edge 186 preventing the same flow of separating, which reduces the aerodynamic drag locally of the vehicle, and accelerates this inside flow, due to the curvature 185, creating an underpressure. The favorable pressure gradient of the profile decelerates the flow again and guides it to the rear of the vehicle, where the flow is expanded into the wake of the vehicle decreasing the underpressure in the wake and thus also reducing the aerodynamic drag at the back of the trailer 3.

FIG. 18 shows an inclined rear edge 182 of the longitudinal flow conductor under a certain angle with respect to the horizontal resulting in a higher efficiency during side wind conditions. This chamfered edge 182, to which any angle and outline required by the user can be assigned, will be referred to as longitudinal flow conductor with chamfered rear edge.

An exemplary seventh embodiment for a trailer 3 of the present invention having an aerodynamic drag reduction device such as the longitudinal flow conductors which can flap away by means of a support structure. This support structure comprises four rods forming a parallelogram with hinged corners providing the desired freedom to translate the longitudinal flow conductor in an upward direction. The support structure is connected to the lower surface 8 of the body volume 4 parallel to its longitudinal lower edge 11 according to the known art of mechanical fixation. The longitudinal flow conductor has to be equipped with several supporting structures to ensure the desired stiffness and flexibility.

Numerous variants are possible in addition to the embodiment shown, but these will remain within the scope of the invention as defined in the claims.

Thus, the invention provides a flow conductor comprising a streamlined outer contour at the front edge. The invention provides a flow conductor which may lead to better aerodynamic performances of vehicle combinations, which may result in great savings in fuel consumption.

LEGEND 1 tractor-trailer combination
2 tractor
3 trailer
4 trailer body
5 front surface trailer body
6 left surface trailer body
7 top surface trailer body
8 bottom surface trailer body
9 right surface trailer body
10 rear surface trailer body
11 lower trailer body edge left
14 front trailer body edge left
15 lower trailer body edge right
19 lower front trailer body edge
20 lower rear trailer body edge
23 left support leg trailer
24 right support leg trailer
25 pallet box trailer
26 wheel assembly trailer
27 left storage volume trailer
28 right storage volume trailer
29 king-pin trailer
30 supporting structure
31 left flow conductor with elliptical curvature
32 lower edge left flow conductor
33 rear edge left flow conductor
34 upper edge left flow conductor
35 front edge left flow conductor
36 elliptical curved edge left flow conductor
37 slooping/dcaying edge left flow conductor
38 right flow conductor with elliptical curvature
39 lower edge right flow conductor
40 rear edge right flow conductor
41 upper edge right flow conductor
42 front edge right flow conductor
45 outer suface
46 innder surface
47 imaginary plane
51 rigid truck with drawbar and trailer
52 rigid truck
53 lorry
54 lorry body
55 front surface lorry body
56 left surface lorry body
57 top surface lorry body
58 bottom surface lorry body
59 right surface lorry body
60 rear surface lorry body
61 lower lorry body edge left
65 lower lorry body edge right
69 lower lorry front body edge
70 lower lorry rear body edge
73 wheel assembly lorry
74 drawbar lorry
75 supporting structure lorry
76 left storage volume lorry
77 right storage volume lorry
78 left flow conductor lorry with elliptical curvature
79 lower edge left flow conductor
80 rear edge left flow conductor
81 upper edge left flow conductor
82 front edge left flow conductor
83 elliptical curved edge left flow conductor
84 slooping/dcaying edge left flow conductor
85 right flow conductor lorry with elliptical curvature
86 lower edge right flow conductor
87 rear edge right flow conductor
88 upper edge right flow conductor
89 front edge right flow conductor
92 drivers cabin rigid truck
93 body volume rigid truck
94 wheel assemblies rigid truck
95 storage volume rigid truck
101 big pallet box
102 left flow conductor with back step
103 lower edge left fllow conductor
104 rear edge left flow conductor
105 upper edge left flow conductor
106 front edge left flow conductor
107 elliptical curvature left flow conductor
108 back step left flow conductor
109 right flow conductor with back step
120 left flow conductor with circular curvature
121 lower edge left flow conductor
122 rear edge left flow conductor
123 upper edge left flow conductor
124 front edge left flow conductor
125 circular curvature left flow conductor
126 slooping/decaying edge left flow conductor
127 right flow conductor with circular curvature
140 left flow conductor with airfoil based profile
141 lower edge left flow conductor
142 rear edge left flow conductor
143 upper edge left flow conductor
144 front edge left flow conductor
145 airfoil based curvature left flow conductor
146 right flow conductor with airfoil based profile
160 left flow conductor with chamfered front
161 lower edge left flow conductor
162 rear edge left flow conductor
163 upper edge left flow conductor
164 chamfered front edge left flow conductor
165 elliptical curvature left flow conductor
166 slooping/decaying edge left flow conductor
167 right flow conductor with chamfered front
180 left flow conductor with chamfered rear
181 lower edge left flow conductor
182 chamfered rear edge left flow conductor
183 upper edge left flow conductor
184 front edge left flow conductor
185 elliptical curvature left flow conductor
186 slooping/decaying edge left flow conductor
187 right flow conductor with chamfered rear

The invention claimed is:

1. Flow conductor for use as a side skirt, which is plate-shaped having a front edge, a lower edge, a rear edge and an upper edge, wherein the flow conductor is mountable along the upper edge in a substantially vertical position to a body portion of a pulled vehicle of a vehicle combination of at least two pivotally connected vehicles, wherein the flow conductor extends at least partially under the body portion in a longitudinal direction along an outer edge of the pulled vehicle, wherein the flow conductor comprises locally in conjunction with the front edge a thickened portion, which has in a cross-section transversally to the front edge a streamlined outer contour.

2. Flow conductor according to claim 1, wherein the outer contour of the thickened portion in cross section comprises a curvature with an airfoil part.

3. Flow conductor according to claim 1, wherein the outer contour comprises a curvature with an elliptical part.

4. Flow conductor according to claim 1, wherein the outer contour comprises a curvature with a circular part having a radius of at least 100 mm.

5. Flow conductor according to claim 1, wherein the thickness of the thickened portion is at least 50 mm.

6. Flow conductor according to claim 1, wherein the flow conductor comprises an inner and an outer surface for positioning the flow conductor with the inner surface to the inside of a pulled vehicle, wherein the thickened portion has a height dimension in a direction perpendicular to the outer surface of the flow conductor of at least 50 mm.

7. Flow conductor according to claim 1, wherein the thickened portion of the flow conductor extends through an imaginary plane which is parallel to the outer surface of the flow conductor at a distance of 100 mm.

8. Flow conductor according to claim 7, wherein the imaginary plane is parallel to the outer surface of the flow conductor at a distance of 210 mm.

9. Flow conductor according to claim 1, wherein the plate shaped flow conductor comprises an inner and an outer surface, which inner surface is to be arranged inwards with respect to a vehicle, when the flow conductor is to be mounted to a vehicle, wherein the thickened portion is positioned at the inner surface of the flow conductor.

10. Flow conductor according to claim 1, wherein the flow conductor extends over substantially the whole length of the vehicle to guide an air stream from the front of the vehicle along the underside of the body portion to the back of the vehicle.

11. Flow conductor according to claim 1, wherein a front chamfer is provided between the front edge and the lower edge.

12. Flow conductor according to claim 1, wherein a rear chamfer is provided between the rear edge and the lower edge.

13. Flow conductor according to claim 1, wherein the front or rear chamfer has a dimension in a direction of the front edge of at least 100 mm.

14. Flow conductor according to claim 1 made of dicyclopentadiene.

15. Aerodynamic device comprising a set of two flow conductors according to claim 1, wherein the flow conductors have a geometry in substantially mirror symmetry.

16. Trailer having an undercarriage which is supported by a wheel assembly, wherein the trailer comprises a flow conductor according to claim 1.

17. Trailer according to claim 16, wherein cool gaps are provided in the flow conductor at a position near the wheel assembly to provide a passage for air to cool a wheel of the trailer.

18. Vehicle which can be pulled in a vehicle-combination having a body portion which is supported by at least one wheel assembly comprising a flow conductor underneath the body portion according to claim 1.

19. Vehicle according to claim 18, wherein the flow conductor is pivotally connected to the body portion.

20. Vehicle according to claim 18, wherein the front edge of the flow conductor is substantially aligned with the front surface of the body portion of the vehicle.

* * * * *

UNITED STATES PATENT AND TRADEMARK OFFICE
CERTIFICATE OF CORRECTION

PATENT NO.         : 8,616,616 B2                                    Page 1 of 1
APPLICATION NO.    : 12/672923
DATED              : December 31, 2013
INVENTOR(S)        : Gandert Marcel Rita van Raemdonck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this
Twenty-second Day of September, 2015

Michelle K. Lee
*Director of the United States Patent and Trademark Office*